United States Patent [19]
Callebert et al.

[11] Patent Number: 5,972,214
[45] Date of Patent: Oct. 26, 1999

[54] COLUMN WITH DISTRIBUTOR FOR ALLOWING INDEPENDENT INJECTION AND/OR REMOVAL OF FLUIDS

[75] Inventors: Olivier Callebert, Rueil Malmaison; Jean-Paul Dessapt, Beynes; Annick Pucci, Croissy sur Seine; Pierre Renard, Saint Nom la Breteche, all of France

[73] Assignee: Institut Francais du Petrole, Rueil-Malmaison, France

[21] Appl. No.: 08/961,093

[22] Filed: Oct. 30, 1997

Related U.S. Application Data

[62] Division of application No. 08/734,266, Oct. 21, 1996, Pat. No. 5,755,960.

[30] Foreign Application Priority Data

| | | | |
|---|---|---|---|
| Oct. 20, 1995 | [FR] | France | 95 12969 |
| Nov. 21, 1995 | [FR] | France | 95 13811 |
| Nov. 21, 1995 | [FR] | France | 95 13812 |
| Nov. 21, 1995 | [FR] | France | 95 13813 |

[51] Int. Cl.$^6$ ................................. B01D 15/08
[52] U.S. Cl. ............... 210/198.2; 210/283; 210/284; 210/285; 210/541; 210/656; 210/659; 96/107
[58] Field of Search ............... 210/198.2, 283, 210/284, 285, 289, 291, 541, 656, 659; 96/107

[56] References Cited

U.S. PATENT DOCUMENTS

| | | | |
|---|---|---|---|
| 3,214,247 | 10/1965 | Broughton | 210/284 |
| 3,230,167 | 1/1966 | Golay | 96/107 |
| 3,250,058 | 5/1966 | Baddour | 96/107 |
| 3,374,606 | 3/1968 | Baddour | 96/107 |
| 3,453,811 | 7/1969 | Crowley | 96/107 |
| 3,494,103 | 2/1970 | Mir | 96/107 |
| 3,522,172 | 7/1970 | Pretorius | 96/107 |
| 3,719,591 | 3/1973 | Crits | 210/675 |
| 3,723,072 | 3/1973 | Carson et al. | 23/288 R |
| 3,948,775 | 4/1976 | Otani et al. | 210/264 |
| 4,354,932 | 10/1982 | McNeil | 210/198.2 |
| 4,400,278 | 8/1983 | Martinola | 210/678 |
| 4,461,706 | 7/1984 | Siegers | 210/275 |
| 4,636,315 | 1/1987 | Allen, Jr. | 210/656 |
| 4,891,133 | 1/1990 | Colvin, Jr. | 210/198.2 |
| 5,084,184 | 1/1992 | Burns | 210/198.2 |
| 5,141,635 | 8/1992 | LePlang et al. | 210/198.2 |
| 5,200,075 | 4/1993 | Otani et al. | 210/283 |
| 5,316,821 | 5/1994 | Otani et al. | 428/131 |
| 5,324,426 | 6/1994 | Joseph et al. | 210/198.2 |
| 5,354,460 | 10/1994 | Kearney et al. | 210/198.2 |

FOREIGN PATENT DOCUMENTS

| | | | |
|---|---|---|---|
| 2181853 | 12/1973 | France . | |
| 95/03867 | 2/1995 | WIPO | 210/198.2 |

*Primary Examiner*—John Kim
*Attorney, Agent, or Firm*—Antonelli, Terry, Stout & Kraus, LLP.

[57] ABSTRACT

The invention is a column for separating a substance from a liquid having a plurality of separable compounds. The column has at least a first and a second bed of granular solids separated by at least one device, the device has at least a collection device which collects the substance to be separated, the collection device being in fluid connection to at least one mixing chamber, at least a first circuit for injection and/or removal of a first secondary fluid $B_1$ and at least a second injection and/or removal circuit of a second secondary fluid $B_2$. The injection and/or removal circuits are in communication with the mixing chamber with at least one opening allowing passage of the secondary fluids $B_1$, $B_2$ into the mixing chamber. The mixing chamber has at least one inlet orifice and at least one outlet orifice, and a device which redistributes the fluid coming from the mixing chamber, wherein the injection and/or removal circuits are separated and disposed in a vicinity of the mixing chamber along at least one wall of the chamber that has a direction substantially parallel to the device axis.

13 Claims, 10 Drawing Sheets

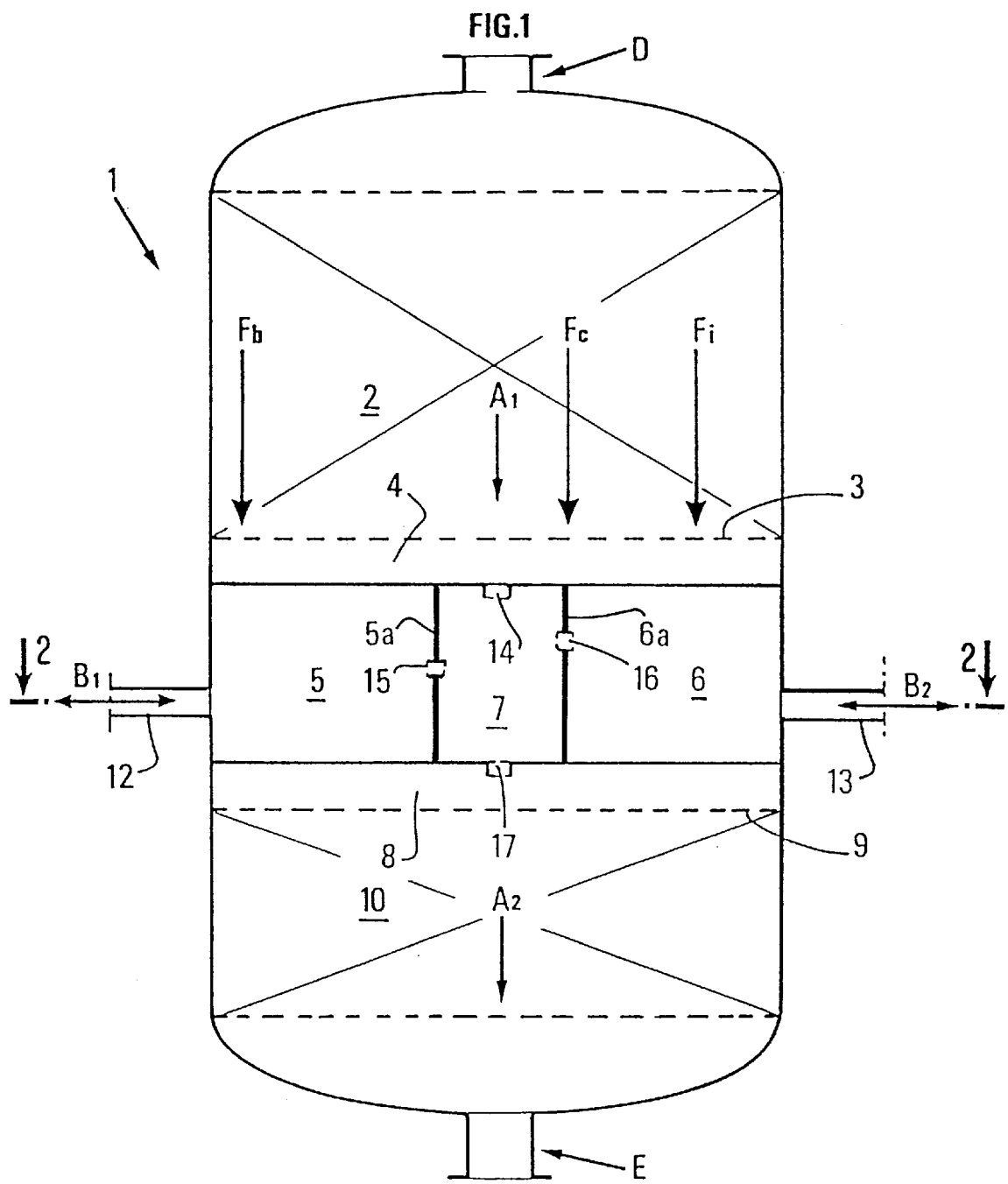

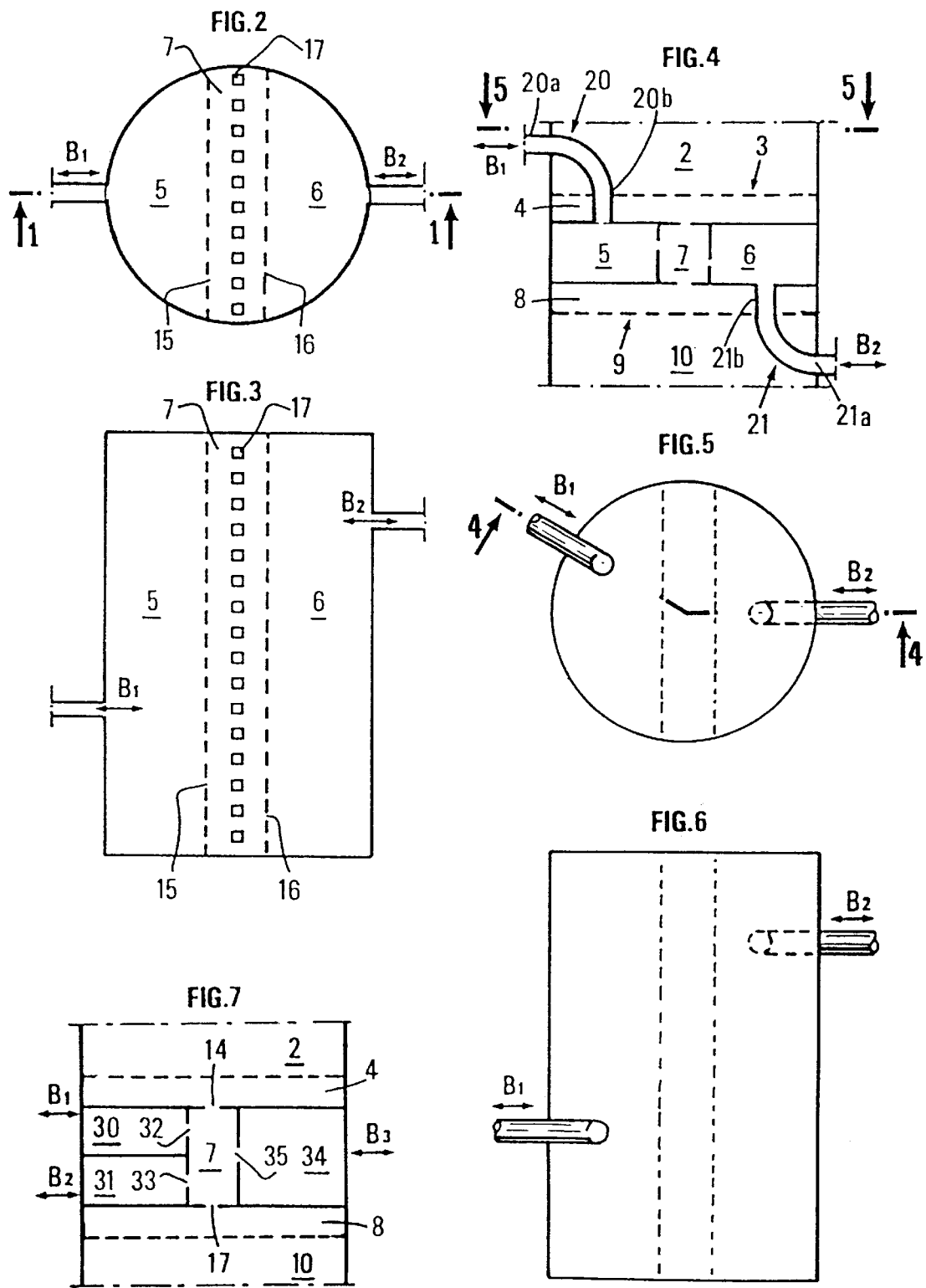

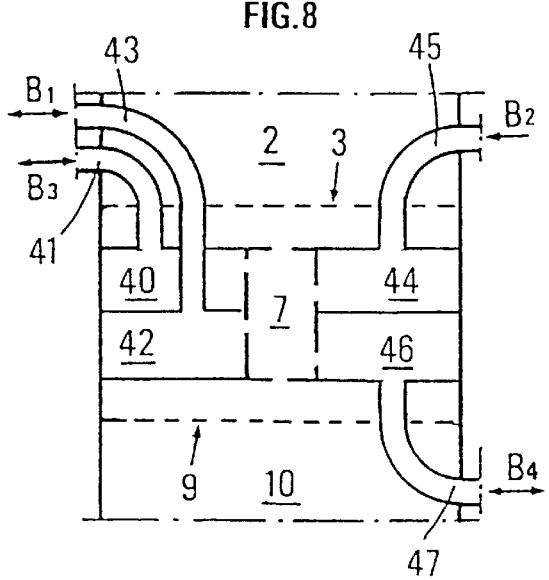
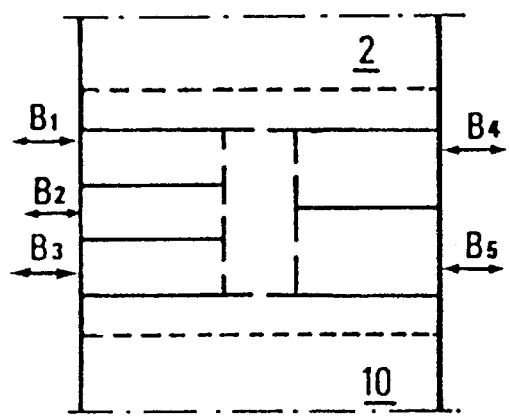
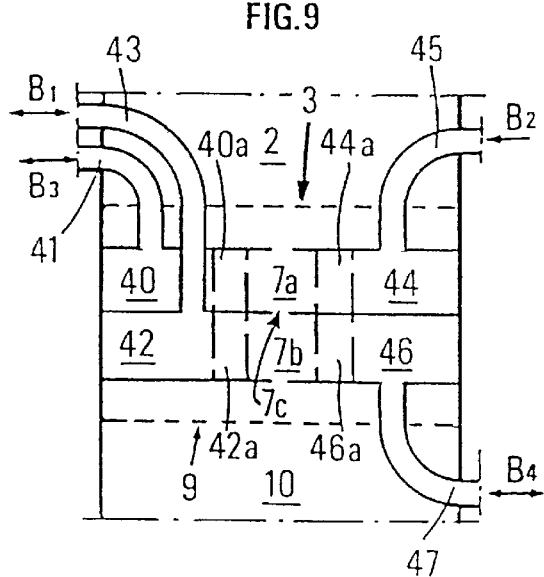
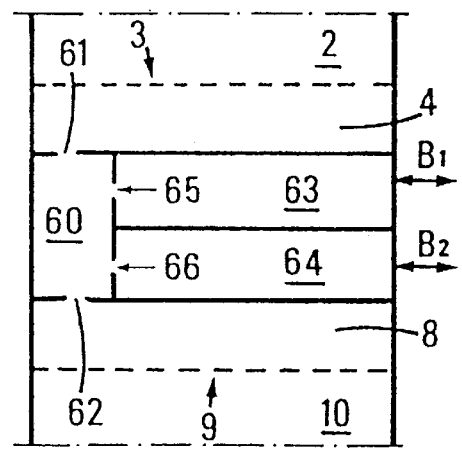

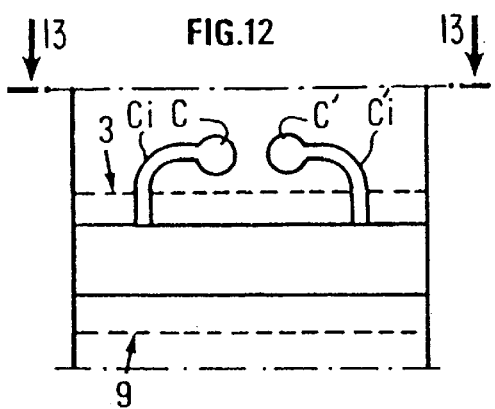
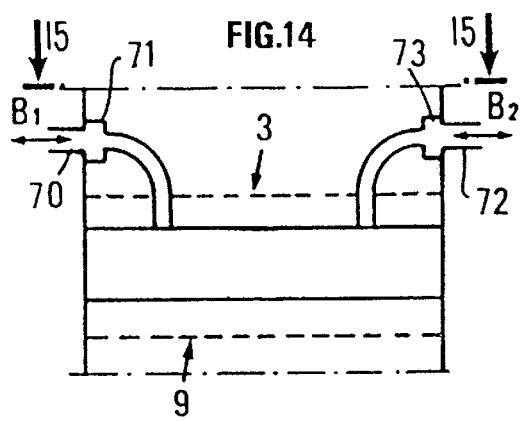
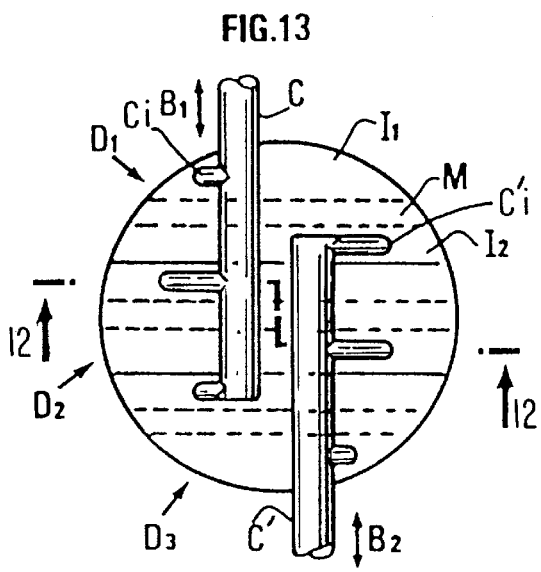
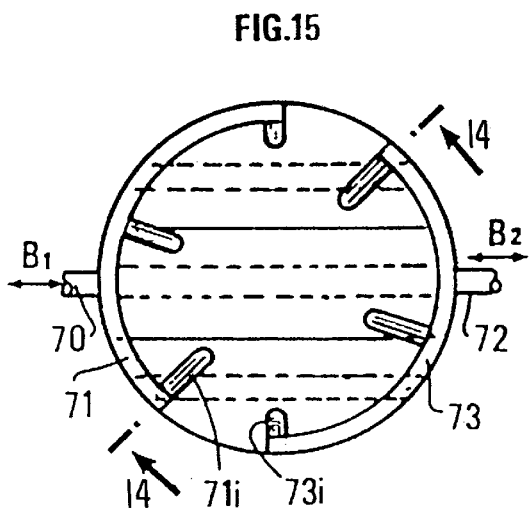
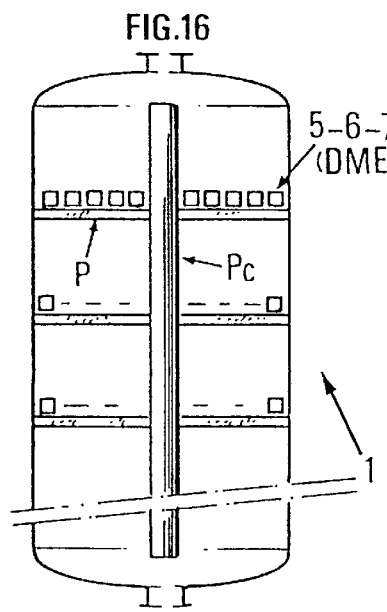
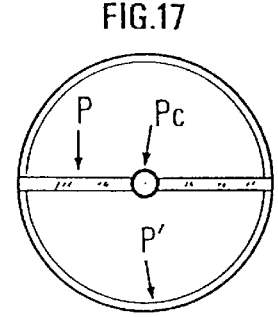
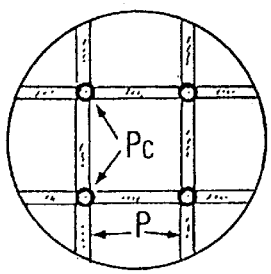
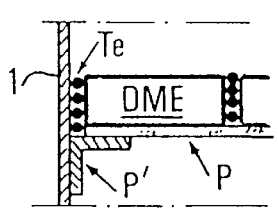

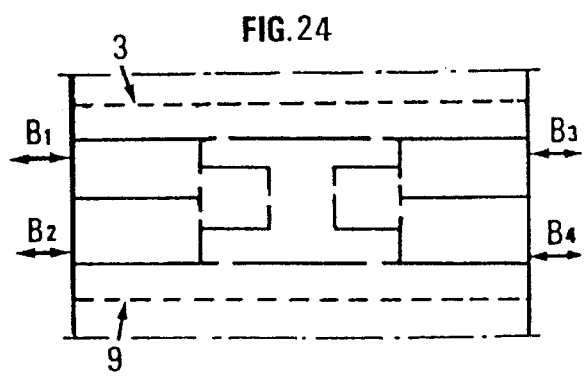
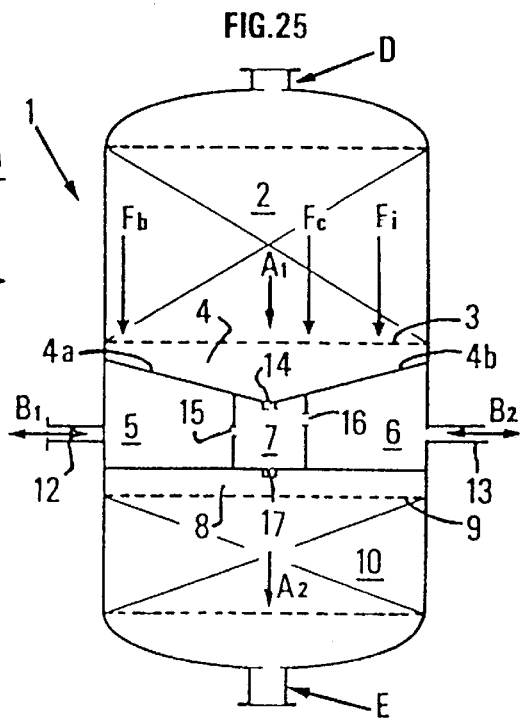
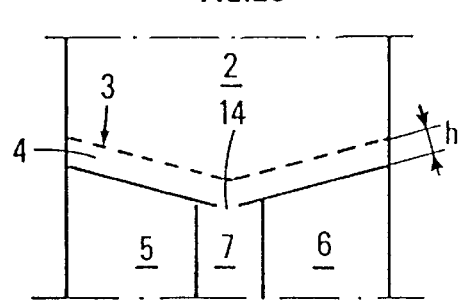
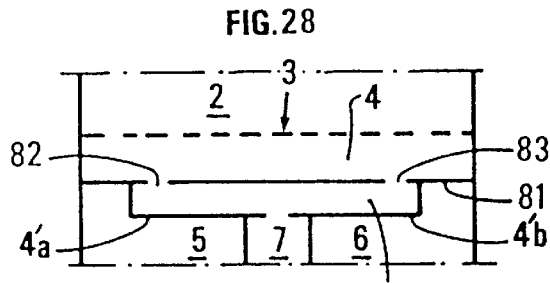
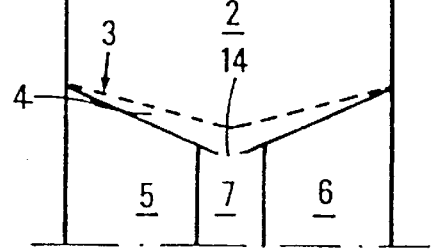
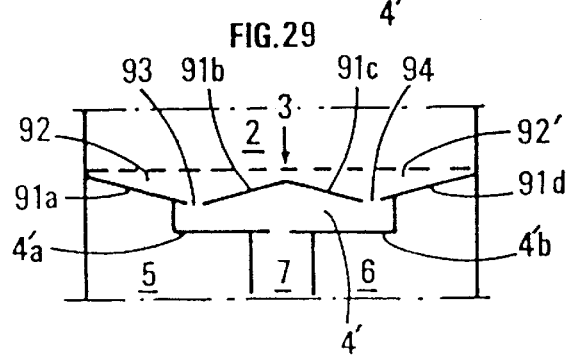

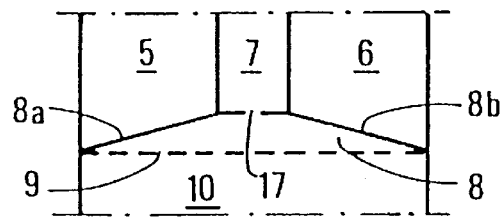
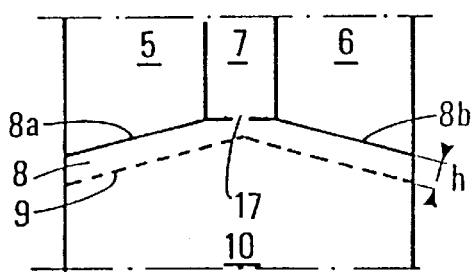
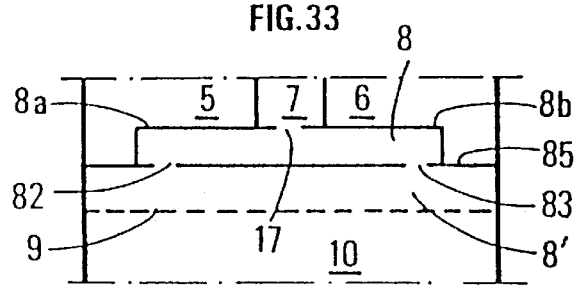
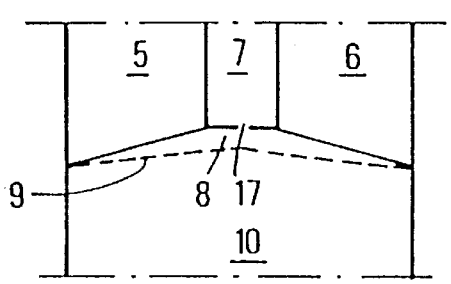
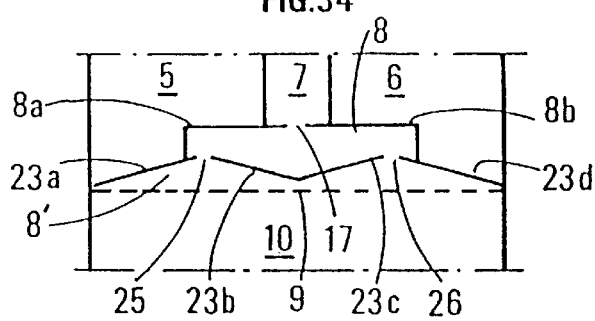
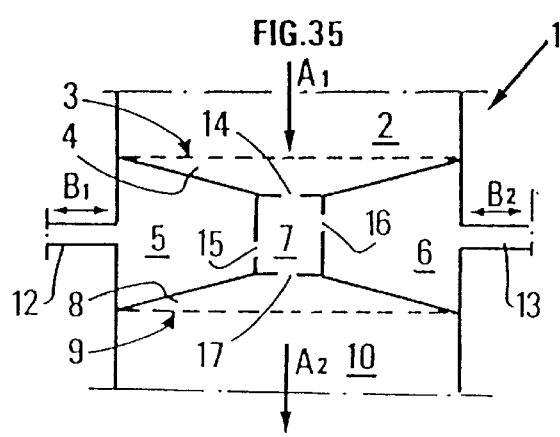
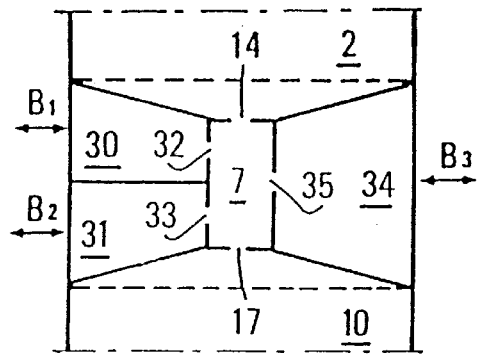

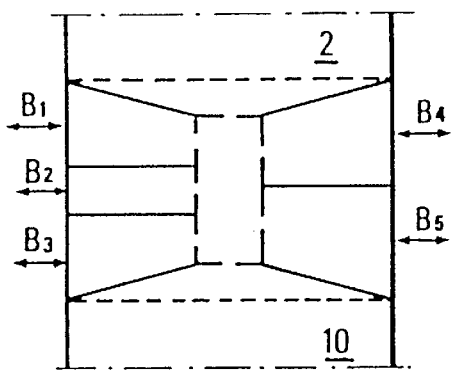
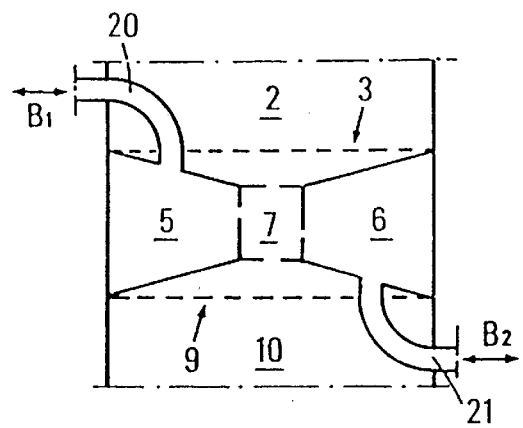
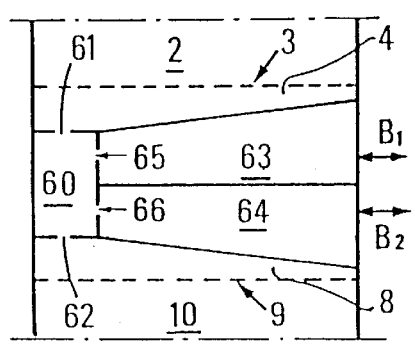
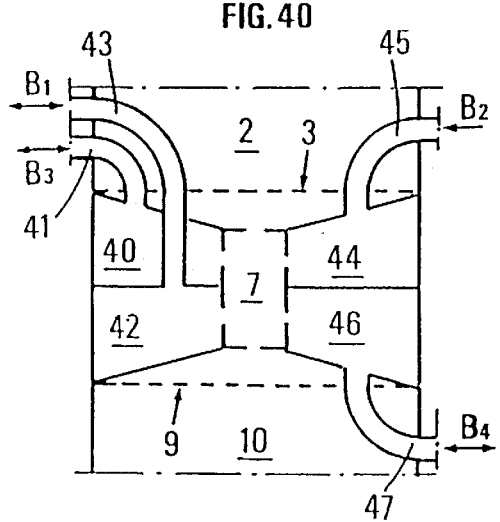

COLUMN WITH DISTRIBUTOR FOR ALLOWING INDEPENDENT INJECTION AND/OR REMOVAL OF FLUIDS

This is a Divisional application of U.S. Ser. No. 08/734,266, filed Oct. 21, 1996, now U.S. Pat. No. 5,755,960.

BACKGROUND OF THE INVENTION

1. Field of the Invention

The present invention relates to a device, hereinafter abbreviated DME, and a process for distributing, mixing, adding, and/or removing several fluids, at least one main fluid and at least two other secondary fluids.

The invention is applied in particular in the field of chromatography for fluids in the gaseous, liquid, or supercritical state.

2. Description of the Prior Art

When separation processes by distillation are ineffective, it is possible and normal to call on simulated fluidized-bed systems to separate substances containing for example several different chemical compounds or substances containing isomers.

Chromatography processes generally use several fluids, called secondary fluids to distinguish them from the main fluid or substance to be separated, circulating in the chromatography column.

These secondary fluids can be of different kinds and can be removed from the column or injected into the column for example at the DME.

This difference in the nature of the fluids leads, for example, to risks of contamination, as one fluid may be in contact with another fluid, requiring additional flushing operations when a common injection a removal circuit is used for the various secondary fluids.

In addition, during chromatography, particularly at the end of the removal operation of a first fluid, a plug or remnant of this fluid is left behind, which needs to be eliminated before a second fluid is removed and/or injected.

For this purpose, a preliminary operation consists of pushing out or removing this plug from the column.

The flushing operations normally conducted to clean and/or drain the circuits contribute to increasing the complexity of the stages of the process used in the column as well as its cost and can decrease its efficiency.

Moreover, in certain processes, it is very important to achieve distribution or collection of the fluids circulating in the bed that is as homogeneous as possible.

In particular, in the area of simulated fluidized-bed chromatography, usually operated in a simulated countercurrent, and which in the majority of cases combines columns with large diameters or sections, and numerous separation stages, it is thus necessary to have one DME between each separation stage to ensure that the main fluid (A) is collected as uniformly as possible and that one or more secondary fluids are distributed and/or removed, and that the mixture formed inside the DME is redistributed.

Hence it is very important to render propagation of the main fluid in the column as uniform as possible by having a piston-type flow. One of the means of achieving this is to minimize the differences in travel time between the various flow lines of the flowing fluid, or between the various fluid particles, before they enter the mixing chamber. This is because these flow lines will have different path lengths and travel times depending on the position of their circulation route inside the column, this route being for example referenced with respect to the column axis (or to one of its walls), and to the position of the mixing chamber, particularly the opening of the chamber allowing fluid to pass.

For example, when the mixing chamber is disposed substantially in the center of the column and at an opening located in the vicinity of the central axis of this column, the travel time for a line of fluid circulating near the outer wall of the enclosure is greater than the travel time of a line of fluid circulating near the center of the column.

These differences in travel time bring about displacements in the arrivals of the flow lines or fluid lines in the mixing chamber which can bring about perturbations in the level of the traveling front of the main fluid. This lack of homogeneity in arrival times may affect the mixing quality in this chamber and perturb the various main fluid propagation streams advancing or propagating "piston-wise."

Among the distributor systems or DMEs described in prior publications and used industrially for specialty chemicals, laboratories, or large industries, the Amicon Company offers a DME that has a central baffle-distributor system that leads to correct distribution of the main fluid with small dead volumes. However, it does not have means of adding and/or removing a secondary fluid, nor means for optimally mixing a main fluid with a secondary fluid.

Moreover, the central baffle system brings about some perturbation in radial distribution of the main fluid, and the pressure drop is relatively great due to high flowrates at the relatively small central collecting point in the distributor.

It will be remembered that the terms "upstream" and "downstream" are relative to the circulation direction of the main fluid circulating in the beds of granular solids and passing through the DME.

U.S. Pat. No. 3,948,775 describes a DME used in a chromatography column with two beds in which the main fluid (A) is collected downstream from a grid located at the outlet of the first bed by a conduit and sent to a point upstream of the second bed, and from a collecting grid by a conduit, before being redistributed laterally in the second bed. The secondary fluid (B) can be introduced via an additional conduit and mixed in line with the main fluid, with the mixing taking place essentially at one point. The collecting and redistribution areas are separated by an inclined fluidtight baffle and thus allow conical collection with a small dead volume.

Nonetheless, the existence of an outside line creates an additional dead volume that can generate a back-mixing phenomenon and additional pressure drops.

Moreover, because of its lack of symmetry, the lateral distribution of the fluids can bring about imperfect homogenization for columns that have large diameters.

The teaching contained in U.S. Pat. No. 3,214,247 consists of collecting all the main fluid downstream of a baffle and then channeling it into a space delimited by the baffle and injection means for a secondary fluid. The main fluid channel is mixed in the space thus defined with the secondary fluid distributed in the form of transverse jets, and the resulting mixture is then redistributed in the space located below the baffle before being sent to the second bed. Because of the inclined shape of the baffle walls, this device has small dead volumes and the pressure drop created is relatively moderate because of the transverse collection.

However, the main fluid collecting space, the secondary fluid injection space, and the mixing space are not precisely delimited, which prevents the mixing function from being totally controlled. Moreover, as the mixing area is not confined to the central area, back-mixing phenomena may then occur throughout the conical collecting and/or redistribution section.

U.S. Pat. No. 3,723,072 describes a device for mixing two fluids inside a mixing chamber before redistributing the mixture in a secondary bed. This device provides a mixture redistribution means that does not optimize redistribution in the bed and does not avoid the perturbation induced because the differences in propagation time of the main fluid lines in the upper bed vary in their position relative to the enclosure and the entry point into the chamber.

However, none of these devices describes or suggests using several injection and/or removal circuits "dedicated" to one fluid, namely used for passage of a predetermined fluid, thus overcoming the above-mentioned drawbacks.

The word "dedicated" in the context of the invention means that an injection and/or removal circuit sees only the passage of a predetermined fluid when the process is implemented.

SUMMARY OF THE INVENTION

The present invention is an improvement on the above application of the applicant, WO-95/03867, which suggests the possibility of disposing several injection and/or removal circuits of secondary fluids positioned above the mixing chamber. Such an arrangement is appropriate when the number of secondary fluids in the column is a maximum of two. However, it is less appropriate when more than two secondary fluids are injected into and/or removed from the column, due in particular to the complexity of distribution of the conduits connecting the injection and/or removal chambers with the outside of the column.

Thus, the device according to the present invention, is disposed, for example, advantageously in a column having several beds of granular solids, between two of these beds for example. Its particular function is to distribute or collect, from the entire section of the column, and fluid added or removed. Advantageously, it is possible to distribute several DME devices according to the present invention within a single column.

Also, during an injection and/or removal operation, it is preferable for the fluid injected and/or removed to arrive simultaneously at all points of the mixing chamber or mixing chambers, which is not possible when a plug or remnant of fluid whose nature is different from that of the fluid injected and/or removed exists in one of the conduits.

Moreover, while it has proved particularly effective for mixing a main fluid and a secondary fluid, such a device is not optimized to minimize the difference in path length or travel time of the main fluid lines in the bed of granular solids upstream of the DME, or the differences in the mixing lines coming from the DME.

It has been discovered, and this is one of the subjects of the present invention, that the above-mentioned disadvantages can be remedied by using a DME equipped with independent circuits for injection and/or removal of several secondary fluids relative to the mixing chamber. The injection and/or removal circuits of the secondary fluids are arranged for example such as to offer several injection and/or removal accesses for the secondary fluids.

Advantageously, the form of the means for collecting and/or distributing the main fluid or a mixture of fluids coming from the mixing chamber is designed taking into account, for example, the point of departure or injection point of a fluid into the column and its point of entry into the mixing chamber in order to decrease the differences in path length or travel time of the lines of main fluid circulating in the beds. "Fluid lines" is also understood to mean fluid particles circulating in the beds of granular solids.

Thus, the present invention relates to a device or DME for distributing, mixing, injecting, and/or removing several fluids, one of the fluids being a main fluid $A_1$, and at least a first secondary fluid $B_1$ and a second secondary fluid $B_2$, the device having means for collecting main fluid $A_1$, the collecting means being related to at least one mixing chamber, at least a first injection and/or removal circuit of a first secondary fluid $B_1$, and at least a second injection and/or removal circuit of a second secondary fluid $B_2$, the injection and/or removal circuits being in communication with the mixing chamber by means of one or more openings allowing passage of secondary fluids $B_1$ and $B_2$ to or from the mixing chamber, said mixing chamber having at least one inlet orifice for main fluid $A_1$, at least one outlet orifice for the mixture formed by the various fluids, and means for redistributing the mixture coming from the mixing chamber, the redistribution means being disposed downstream of or after the DME for example.

The injection and/or removal circuits are separate and disposed in the vicinity of the mixing chamber along at least one of the walls of the chamber whose direction is substantially parallel to the DME axis.

According to one embodiment of the DME according to the invention, the separate injection and/or removal circuits are disposed on the same side of the mixing chamber for example.

The injection and/or removal circuits are disposed along at least one of the outside walls of the mixing chamber for example. According to a preferred embodiment of the device according to the invention, the independent injection and/or removal circuits are disposed on either side of the mixing chamber, for example along two opposite side walls.

According to one embodiment of the DME, the number of injection and/or removal circuits is at least equal to four for example.

One injection and/or removal circuit is associated with at least one injection and/or removal pre-circuit for example.

According to one embodiment, the mixing chamber is provided with at least one means such as a baffle having one or more orifices to allow the fluid to pass. In this way, the chamber is subdivided into several mixing chambers or subchambers.

The communication between an injection and/or removal circuit and the mixing chamber, or between a pre-injection circuit and the mixing chamber, is affected for example by means of one or more orifices disposed along the walls of the various chambers or circuits. The axes of the orifices are offset relative to each other for example.

In this way, a fluid coming from an orifice located in a wall does not pass through an orifice located on another wall after following a direct path.

The device according to the invention can have collecting means and/or redistribution means with a shape designed for example to minimize the differences in travel time of the fluid lines before their entry into the mixing chamber and/or those of the fluid mixture lines coming from the chamber, after this chamber, and up to a point located downstream of the chamber, where the point considered is the bed of granular solids for example.

The collecting means comprise for example a collecting grid extending over substantially the entire DME section and/or a collecting space, at least one of said elements having a shape designed to minimize the differences between the travel times of the various flow lines of the main fluid before their entry into the mixing chamber and/or the redistribution means have at least one redistribution grid extending for example over substantially the entire DME section, at least one of said elements having a shape designed to minimize the differences between the travel times of the various flow lines of the main fluid after exiting from the mixing chamber.

The first injection and/or removal circuit has, for example, one or more openings $O_1$ disposed in the wall common to the first injection and/or removal circuit and to the mixing chamber, and the second injection and/or removal circuit has, for example, one or more openings $O_2$ disposed in the wall common to the second circuit and said mixing chamber. The orientation of the axes of openings ($O_1$, $O_2$) is chosen for example so that the fluid passing through these openings reaches at least one solid part of the wall of said mixing chamber.

The axis of the openings located in the first (or the second) common wall is, for example, oriented such that a fluid leaving this opening goes toward a solid part of said second common wall of said mixing chamber (or the first common wall).

Advantageously, the mixing chambers and injection and/or removal chambers of the DME according to the invention have for example geometries that are chosen and orifices with a distribution chosen to optimize the mixing function of the mixing chamber.

The width of a mixing and/or removal chamber measured between two opposite walls is for example between 10 and 100 mm and preferably between 20 and 60 mm and still more preferably between 30 and 50 mm.

The collecting and/or redistribution means have, for example, respectively a collecting space and a redistribution space, one of these two spaces having for example at least one means such as an anti-splash plug.

For a DME that has, for example, four injection and/or removal circuits disposed relative to the mixing and/or removal chamber such as to have at least one common wall and communication orifices with said chamber, the axes of said orifices disposed in the common wall are for example oriented such that the fluid strikes a solid part of another wall of said mixing and/or removal chamber, said other wall being a wall not common to said mixing and/or removal chambers.

The mixing and/or removal chamber can also have turbulence-promoting means located inside it.

The present invention also relates to a device for distributing, mixing, injecting, and/or removing several fluids, one of the fluids being a main fluid $A_1$ and the other being at least one secondary fluid $B_1$, said device having for example means for collecting said main fluid $A_1$, said collecting means being in relation to at least one mixing chamber, at least one injection and/or removal circuit for a first secondary fluid $B_1$, said circuit communicating with said mixing chamber, for example, with the aid of one or more openings allowing passage of said secondary fluid $B_1$ into said mixing chamber, said mixing chamber having at least one inlet orifice and at least one outlet orifice, and means of redistributing the fluid coming from the mixing chamber. The collecting means have a shape designed to minimize the differences between the travel times of the various main fluid flow lines before their entry into the mixing chamber.

According to another embodiment, the present invention relates to a device for distributing, mixing, injecting, and/or removing several fluids, for example at least one main fluid $A_1$ and least a first secondary fluid $B_1$ and a second secondary fluid $B_2$. The device has for example:

means for collecting said main fluid $A_1$, said collecting means being in relation to at least one mixing chamber, through one or more inlet orifices $O_p$ located in a first wall of said mixing chamber, said mixing chamber being provided with one or more outlet openings $O_m$ in a second wall, at least a first injection and/or removal circuit of a first secondary fluid $B_1$, and at least a second injection and/or removal circuit of a second secondary fluid $B_2$, said injection and/or removal circuits each having a first wall and a second wall common to said mixing chamber and being in communication with the mixing chamber by means of one or more openings $O_1$, $O_2$ disposed in each of said common walls.

The orientation of the axes of said openings $O_1$, $O_2$ located in the first (or the second) common wall is chosen so that the fluid passing through reaches a solid part of the wall of said mixing chamber.

The invention also relates to a column allowing separation of a substance from a fluid having at least several separable compounds. The column has at least a first and a second bed of granular solids separated by at least one DME, the DME has for example means for collecting the substance to be separated, which are in relation with at least one mixing chamber, at least a first circuit for Introduction and/or removal of a first secondary fluid $B_1$ and at least a second injection and/or removal circuit of a second secondary fluid $B_2$. The injection and/or removal circuits communicate with the mixing chamber for example by means of one or more openings allowing passage of secondary fluids $B_1$, $B_2$ to the mixing chamber or from the mixing chamber, the mixing chamber having at least one inlet orifice and one outlet orifice, and means of redistributing the fluid coming from the mixing chamber.

The column has the injection and/or removal circuits separated and disposed in the vicinity of the mixing chamber along at least one wall of the chamber that has a direction substantially parallel to the DME axis.

According to one particular embodiment, the column has at least one DME having for example at least four independent injection and/or removal circuits disposed along at least one of the walls of the mixing chamber, the wall of the chamber having a direction substantially parallel to the axis of the column.

The mixing chamber can have a means such as a baffle provided with at least one orifice allowing the fluid to pass, to subdivide said mixing chamber into several mixing subchambers.

This embodiment in particular optimizes the mixing function by increasing turbulence within each of the parts, which in particular provides improved collecting and/or better distribution under the grid. Moreover, the mechanical strength of the whole is thus reinforced.

The collecting means and/or redistribution means have for example a shape designed to minimize the differences in travel time of the various fluid lines that have passed through at least part of a bed of granular solids before their entry into the mixing chamber and/or to homogenize the travel times of the fluid lines coming from the mixing chamber up to their entry into the second bed located downstream of the DME.

It has, for example, several DMEs disposed side by side and distributed along one or more sections of said column.

According to one advantageous embodiment, several DMEs are disposed side by side and separated by a sufficient distance or space to receive sealing means, said means being in the form of one or more sealing braids, for example.

The space that separates the DMEs closest to the column wall and the column wall would be filled with sealing means itself for example.

In this way, the various beds of granular solids are separated in fluidtight fashion from each other and the granular solids of which they are comprised cannot pass from one bed to another. The seal so effected in particular maintains the integrity of the bed of granular solids, which remains essentially as initially charged.

Once the seal has been produced, all of the main fluid or liquid flowing in the column is compelled to pass through the DME, and hence through the mixing chamber. There is no preferential passage from one bed to another without passing through the mixing chamber. As a result, there is better flow and better distribution of the main fluid through the entire section of the column.

When the column has several DMEs, it is equipped, for example, with at least one main fluid distribution conduit from the outside of the column to at least one injection and/or removal chamber dedicated to one fluid, said main conduit being, for example, connected to at least one of said injection and/or removal chambers by means of a branch, said main conduit passing through the outside wall of said column.

The invention also relates to a column for separating at least one substance from a fluid having at least several separable compounds. The column has for example at least a first bed and a second bed of granular solids separated by at least one DME.

The present invention relates to a column for separating at least one substance from a fluid having at least several separable compounds. The column has for example at least a first bed and a second bed of granular solids separated by one or more DMEs.

According to one embodiment of the invention, the column has for example:
  least one "supporting" means disposed essentially along one lengthwise axis of the column,
  one or more main beams, said beam or beams being connected to the supporting means,
  one or more DMEs, said DMEs being disposed in any given section around the supporting means and above the main beam or beams, said DMEs being separated from each other by sealing means, said DMEs being disposed between a first and a second bed of granular solids and said main beams being embedded in the second bed of granular solids,
  at least one main means of distribution and/or removal of a fluid to an injection and/or removal circuit,
  at least one main means of distribution and/or removal of a fluid to an injection and/or removal circuit.

The present invention is advantageously applied to effecting separation of a chromatography substance.

Thus, the advantages offered by the DME according to the invention are in particular the following:
  the independence of the secondary fluid injection and/or removal circuits avoids possible contamination phenomena and removal of plugs of fluid from inside conduits that are normally common conduits,
  the appropriate shape for the collecting and/or redistribution means improves the propagation of the fluid fronts in the column by minimizing the differences in travel time of the various fluid lines downstream of the DME or upstream, so that a piston-type flow can be obtained,
  minimizing dead volumes by an appropriate choice of the shapes of the collecting spaces,
  back-mixing phenomena, as well as pressure drops, that can interfere with separation of the substances in the area upstream of this DME are minimized due to an appropriate choice of passage orifices and their distribution, and
  it brings about the lowest possible pressure drop for circulation of the main fluid through the column.

The presence of DME supporting means positioned inside the column also allows the mechanical strength of the assembly to be increased if necessary.

BRIEF DESCRIPTION OF THE DRAWINGS

Other characteristics and advantages of the method according to the invention will emerge from reading the description provided below for illustrative and nonlimitative purposes, with reference to the attached drawings wherein:

FIGS. 1, 2, and 3 show schematically a DME according to the invention having two secondary fluid injection and/or removal circuits, FIGS. 4, 5, and 6 show one possible disposition of the secondary fluid injection and/or removal conduits that form part of the injection and/or removal circuits, FIGS. 7 and 10 show two examples of DMEs according to the invention having three and five independent injection and/or removal circuits, FIGS. 8 and 9 show schematically one example of a DME with four injection and/or removal circuits as well as the distribution of the associated injection and/or removal circuits, and an embodiment in which the mixing chamber is divided into two mixing subchambers, FIG. 11 shows one embodiment of the DME in which the various secondary fluid injection and/or removal circuits are positioned on one side of the mixing chamber, FIGS. 12, 13, 14, and 15 show examples of distribution of injection and/or removal conduits according to the number and position of the chambers in the column, FIGS. 16, 17, and 18 describe an arrangement of several DMEs for a column with a large section, provided with means for reinforcing mechanical strength for supporting the DMEs, FIG. 19 shows schematically the arrangement of several DMEs within a large-section column and sealing means between the DMEs, FIGS. 22, 23, and 24 show different alternative dispositions of injection and/or removal chambers and associated prechambers, FIG. 25 shows a variant of FIG. 1 having a main-fluid collecting space designed to minimize the differences in travel time between the various lines of this fluid through the upper bed and the collecting space, FIGS. 26, 27, 28, and 29 show schematically several geometries for the collecting spaces, FIGS. 30, 31, 32, 33, and 34 show different shapes that can be assumed by the redistribution space, FIGS. 35, 36, 37, and 38 show schematically alternative embodiments for the geometry of the collecting and redistribution spaces of the DME of FIGS. 7, 10, and 11,

FIGS. 39 and 40 show embodiments of the DME described in FIGS. 4 and 8, FIGS. 41, 42, and 43 show schematically alternative embodiments of the DME shown in FIGS. 20, 22, and 23, FIGS. 44 and 45 show embodiments of the DME with variable shapes for the injection and/or removal chambers.

DESCRIPTION OF THE PREFERRED EMBODIMENTS

Figure 20:
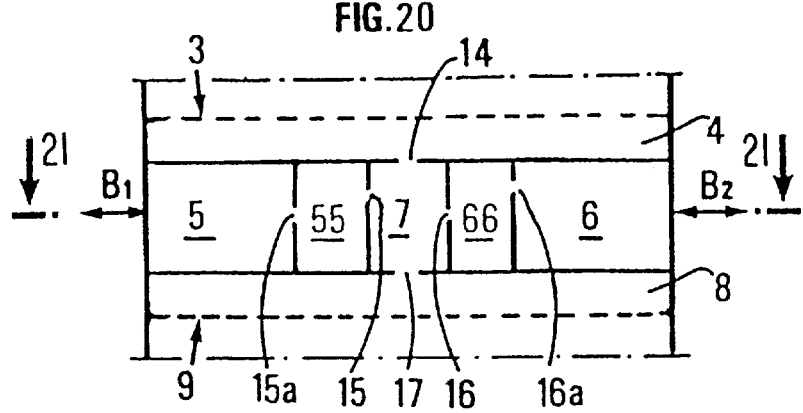
FIGS. 20 and 21 show respectively a cross-sectional view and a top view of a DME with prechambers associated with the secondary fluid injection and/or removal chambers.

FIG. 1 shows schematically one embodiment of a column 1 equipped with a given DME to exploit the principle of the invention. It has, for example, an orifice D through which a main fluid $A_1$ can be introduced and an orifice E located at the end opposite inlet orifice D. These two orifices E and D are preferably located along the main or lengthwise axis of the vertical or horizontal column according to the position of the column. Inside this column, at least a first and a second initially charged bed of granular solids numbered 2 and 10 are separated by at least one distributor-mixer-extractor according to the invention, or DME, comprising the following elements:

means for collecting a main fluid Al circulating in the column through, for example, a first bed of granular solids 2, including, for example, a collecting grid 3 and a collecting space 4, a mixing chamber 7 which has one or more orifices 14 for introducing the main fluid circulating in the column and at least one outlet orifice 17, the orifices preferably being calibrated orifices that can have different shapes as described in detail below, two circuits for injecting and/or removing a first and a second secondary fluid $B_1$ and $B_2$, each having respectively a conduit 12, 13 for example leading to an injection and/or removal chamber 5, 6 disposed, for example, in the vicinity of the mixing chamber and communicating with the latter through one or more openings 15, 16 located in a wall 5*a*, 5*b* common to the injection and/or removal chambers and to the mixing chamber, and means for distributing the fluid mixture created inside mixing chamber 7 and evacuated via outlet orifice 17 located in the lower wall of the mixing chamber, said means having, for example, a distribution space 8 and a redistribution grid 9. The outlet orifice is preferably a calibrated orifice.

The two injection and/or removal circuits are independent and communicate with the outside with sources of secondary fluids having different natures or compositions, or enclosures allowing the fluids to be recovered, said enclosures also being separate and not shown in the figure.

Openings 15, 16 also allow removal and/or injection of fluids from the mixing chamber and/or into the mixing chamber.

The sizes and distribution of orifices 14 for introduction of main fluid $A_1$, mixing chamber outlet orifices 17, and orifices 15 and 16 are preferably chosen to create a pressure drop and a sufficient flowrate to generate turbulence in mixing chamber 7. In this way, strong back-mixing is achieved and the efficiency of mixing main fluid $A_1$ and secondary fluids $B_1$, $B_2$ is increased. Such an arrangement also allows mixing chamber 7 to be isolated from the collecting and redistribution spaces, and direct passage of the stream of secondary fluids to the collecting and redistribution spaces to be minimized.

The inlet orifices 14 of mixing chamber 7 are, for example, series of calibrated holes or slots or series of continuous or discontinuous calibrated slots, preferably regularly spaced to collect main fluid $A_1$ as uniformly as possible before it is introduced into mixing chamber 7.

The size and geometry of these orifices are chosen such that the fluid, entering the mixing chamber, has a flowrate favorable to creating turbulence inside and at the same time creating a pressure drop enabling this turbulence to be confined within the mixing chamber.

Thus, the spacing of inlet orifices 14 of fluid $A_1$ is, for example, between 30 and 150 mm and preferably between 50 and 100 mm. The flowrate of the fluid through the orifices resulting from this spacing varies, for example, between 1 and 5 m/s and preferably between 2 and 3 m/s. The pressure drop created at the outlets of the orifices is between 10 and 100 g/cm$^2$ and preferably between 30 and 60 g/cm$^2$.

The outlet paths 17 of a fluid from the mixing chamber are, for example, formed by a series of continuous or discontinuous calibrated holes or calibrated slots, preferably regularly spaced in order to redistribute the fluid as uniformly as possible into redistribution space 8. The fluid coming from the chamber results, for example, from the mixing of at least one main fluid with at least one secondary fluid or a fluid that has been remixed inside the mixing chamber.

The size of these holes or these slots 17 is chosen, for example, to create a certain pressure drop allowing the turbulence of the mixture to be confined within mixing chamber 7. The value of this pressure drop is between 10 and 100 g/cm$^2$ for example, and preferably between 30 and 60 g/cm$^2$. This pressure drop corresponds in particular to a hole or slot spacing of between 30 and 150 mm and preferably between 50 and 100 mm. These values allow a flowrate value for the fluid leaving the mixing chamber of between 1 and 5 m/s and preferably between 2 and 3 m/s to be obtained.

In this way, collection of the fluid from the mixing chamber and its proper distribution are optimized, with the fluid then passing into redistribution space 8 and finally through redistribution grid 9.

Orifices 15, 16 for introducing or removing secondary fluids $B_1$ and $B_2$ are, for example, formed by a series of calibrated holes, preferably regularly spaced, for injecting and/or removing a secondary fluid $B_1$, $B_2$ as uniformly as possible into or from mixing chamber 7. These orifices are, for example, dimensioned such that the linear flowrate of a secondary fluid entering the mixing chamber is sufficiently large to favor creation of turbulence inside this chamber and to create a significant pressure drop. Orifices 15, 16 can also be in the form of calibrated continuous or discontinuous slots.

The fluid flowrate through outlet orifices 15, 16 is, for example, between 1 and 15 m/s, preferably between 5 and 10 m/s. The hole spacing is chosen, for example, to be between 30 and 150 mm and preferably between 50 and 100 mm. The corresponding pressure drop varies between 100 and 2000 g/cm$^2$ and preferably between 200 and 1000 g/cm$^2$.

As shown in FIGS. 2 and 3, orifices 15 and 16 are arranged along walls common to an injection and/or removal chamber and to the mixing chamber so that the fluid passing through strikes a solid wall of the mixing chamber located opposite the wall containing the orifices. The distribution of these orifices is chosen, for example, such that they are offset relative to each other to prevent passage of a secondary fluid into a chamber not dedicated to it.

The mixing efficiency in mixing chamber 7 can also be obtained by choosing the geometry and size of the injection and/or removal chambers to ensure a substantially identical fluid flowrate at all the outlet orifices. For example, the developed length ratio of the chambers at their mid-width or equivalent is less than 30 for example, preferably less than 20, and preferably less than 10.

Advantageously, the width of the mixing chamber is chosen, for example, as a function of the flowrate value of the secondary fluids flowing through one of orifices 15, 16 into the mixing chamber so that the secondary fluid encounters the wall of the mixing chamber located opposite the wall from which this fluid comes. In this way, the mixing function of this chamber is improved and optimized.

The collecting and redistribution grids are, for example, In the form of a metal grid or screen. Ordinary Johnson grids or the like made of steel or stainless steel can be used.

The spacing of the wires or elements forming this grid is preferably approximately 0.15 mm more or less 0.05 mm. The value of this spacing is chosen to achieve a good flow of the fluid circulating in the first bed to the collecting space while preventing the solid grains of the bed from obstructing this spacing or being able to pass between the wires of the grid.

Some, for example, are in the form of wires welded to small beams or rods, or to larger beams with a height of between 10 and 15 mm for example.

FIG. 3 thus shows two injection and/or removal chambers 5, 6 with an elongate rectangular shape. The chambers are, for example, next to a mixing chamber 7 and have substantially identical shapes on either side of this chamber. The mechanical assembly thus constituted is in the form of a caisson, having, for example, a substantially flat shape.

The caisson separates collecting space 4 from redistribution space 8, for example in their totality and practically over the entire section of the column.

According to another embodiment, the DME is, for example, in the form of a substantially flat "pancake" disposed horizontally for example when the axis of the column is vertical, preferably having a small thickness, with the peripheral shape possibly being circular.

The assembly thus obtained is advantageously in the form of a caisson which simultaneously provides the functions of collecting, distributing, and/or mixing and/or removing fluids as the same time as a supporting function.

According to one preferred embodiment, the bed of granular solids is charged by an appropriate apparatus such as that described in French Patent 2,721,900 of assignee.

Advantageously, the particles forming the bed have diameters of approximately 0.4 to 1 mm. The column is filled such that these particles rain down with preferably no mechanical friction.

In this way, the filling of the column is reproducible, dense, and even. Filling by this method minimizes interstitial dead volumes between particles and the risk of channelling or preferential fluid passage, counteracting the sought-after piston-type flow.

In this way, a bed of particles with a substantially stable structure over time is obtained, with later compaction of this bed being very little or even zero.

Charging is effected from the head of the column, or its top end, for example, and during charging the column can be equipped with and have, or not have, means for supporting the DMEs described with reference to the following figures.

For example, the particles can be sent by means of the aforementioned system at a charging speed of approximately 1 cm/min maximum, which allows a particle bed depth of approximately 1 m to be filled in approximately two to three hours.

Advantageously, the column is charged in a dry atmosphere in order to control the humidity of the particle bed, an important parameter in the process. If the atmosphere is moist, the particles (molecular sieve) become charged with water, which can damage the screen when it is started and require a lengthy drying-out phase.

The process implemented with this DME device disposed between two beds of granular solids has, for example, the following stages provided solely for illustration and not limitatively:

For example a main fluid $A_1$ is introduced through the upper opening of column D. This fluid circulates through first upper bed 2 before being collected as uniformly as possible at collecting grid 3 and at collecting space 4. It penetrates mixing chamber 7 through calibrated orifices 14 disposed over substantially the entire length of the upper wall of the mixing chamber for example. This produces substantially uniform introduction of the main fluid into this chamber, while generating turbulence beneficial to mixing efficiency within this chamber.

Injection of secondary fluids $B_1$ and $B_2$ into the separate injection and/or removal chambers is effected sequentially for example, but according to a substantially identical process, as follows:

secondary fluid $B_1$ (or $B_2$) is brought and introduced into chamber 5 (6) via tube 12 (13), to be injected into mixing chamber 7 through calibrated orifices 16 (16), distributed uniformly over the entire length of the chamber for example such as to achieve uniform injection. This injection is effected at a high injection rate favorable to the mixing efficiency of a secondary fluid $B_1$, $B_2$ with main fluid $A_1$ due to the creation of strong turbulence in a confined space, delimited by mixing chamber 7 and orifices 14, 17, at least.

Conversely, secondary fluids $B_1$ and $B_2$ can be removed through the same device (DME). Calibrated orifices 15, 16 allow uniform takeup of fluids and uniform collection of these fluids 5, 6 in the chamber. The fluids are then removed through conduits 12, 13.

FIGS. 4, 5, and 6 show schematically, in several sections, possible arrangements for the injection and/or removal conduits of secondary fluids $B_1$ and $B_2$ in the case of a column with two injection and/or removal chambers.

The injection and/or removal conduit 20 of a first fluid $B_1$ is composed, for example, of a first part 20a that passes radially through column 1, this first part being extended by a second part 20b that passes through the grid and collecting space 3, 4, in a direction substantially parallel to the lengthwise axis of the column, for example, and terminates at the upper wall of injection and/or removal chamber 5.

Conduit 21, which has, for example, a substantially similar geometry, has a first part 21a and a second part 21b, and is brought to the lower wall of the second injection and/or removal chamber 6 through grid 8 and the redistribution space.

In the embodiments described in these three figures, orifices 15, 16 are offset to allow passage of fluid $B_1$ into chamber 6 and passage of fluid $B_2$ into chamber 5.

FIG. 7 shows one example of the device having three injection and/or removal chambers for three secondary fluids, $B_1$, $B_2$, and $B_3$.

Injection and/or removal chamber 30 sees passage, for example, of a first fluid $B_1$ and is disposed, for example, above injection and/or removal chamber 31 which sees passage of a second secondary fluid $B_2$, which is different, for example, from first fluid $B_1$. Each of these chambers 30, 31 communicates with mixing chamber 7 through one or more orifices 32, 33 having injection axes oriented preferably so that a jet of fluid passing through terminates at a solid wall of mixing chamber 7, located for example opposite the walls containing orifices 32, 33. This avoids or minimizes passage of fluids from chambers 30, 31 to another injection and/or removal chamber.

These two chambers are, for example, disposed on one side of the mixing chamber, along a wall whose direction is substantially parallel to the vertical axis of the column.

On the other side of this chamber is a third injection and/or removal chamber 34 whose height is for example substantially identical to the combined heights of the two chambers 30 and 31. It communicates with mixing chamber 7 through one or more calibrated orifices 35 whose axis or axes terminate(s) at a solid wall of the mixing chamber.

Such an arrangement allows the various secondary fluids $B_1$, $B_2$, $B_3$ injected into the mixing chamber to "smash" against a solid wall or to strike it such as to mix intimately inside mixing chamber 7. Moreover, passage of secondary fluids with different kinds into chambers not dedicated to them is avoided.

The collecting and/or redistribution means of the mixture have characteristics substantially similar to those of the spaces described in the preceding figures.

The same applies to the characteristics of the inlet and outlet orifices 14 and 17 for the main fluid in the mixing chamber, as well as the passage orifices for the various secondary fluids in the injection and/or removal chambers from or to the mixing chamber.

FIG. 8 shows one example of the arrangement of four injection and/or removal chambers 40, 42, 44, and 46 and the distribution of various conduits for fluids $B_1$, $B_2$, $B_3$, and $B_4$ relative to the column.

In this case, the conduits, 41, 43 and 45, 47 are used to introduce and/or remove the four fluids $B_1$, $B_2$, $B_3$, and $B_4$.

Conduits 41 and 43 can have shapes and paths similar to those described in FIG. 4 to reach the two injection and/or removal chambers 40 and 42, passing through the upper wall of each of these chambers, conduit 43 passing through chamber 40 along an axis substantially parallel to the main or lengthwise axis of the column and over the entire height of chamber 40 when the latter occupies the entire section of the column, or when this chamber is positioned above chamber 42 and has a section larger than that of chamber 40.

Conduit 45 passes through one of the lengthwise walls of column 1 radially to rejoin, along a path with a geometry substantially identical to that of conduit 43, the upper wall of injection and/or removal chamber 44, while in this embodiment, conduit 47 takes a similar path to rejoin injection and/or removal chamber 46 near its lower wall.

It should be understood that, without departing from the framework of the invention, the paths and geometries of the various conduits can be designed according to the following parameters:

the geometry of the column, the number and geometries of the various chambers, and the access conditions to the column.

FIG. 9 shows an embodiment of the DME of FIG. 8 in which mixing chamber 7 is subdivided into two parts or mixing subchambers 7a and 7b by means of a baffle or wall 7c provided for example with one or more calibrated orifices, said orifices being for example in the form of calibrated holes or continuous or discontinuous calibrated slots that can run in the lengthwise direction or another direction of the wall or baffle.

By subdividing the mixing chamber, the effect created by the turbulence of the fluids in first mixing subchamber 7a before passing into second mixing subchamber 7b is optimized. In this way, the resultant effect of the fluid turbulence is improved throughout the mixing chamber.

Figure 21:
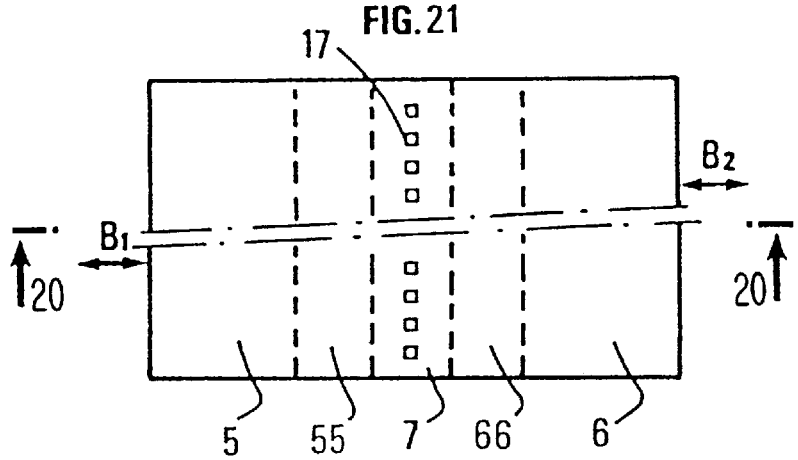

This figure shows a prechamber shown in detail in FIGS. 20 and 21 for example, and disposed between a mixing subchamber 70, 76 and a distribution and/or removal chamber (40, 44); (42, 46).

FIG. 10 shows schematically an example of a DME with five independent secondary fluid injection and/or removal circuits.

This embodiment can be particularly useful for example to bring an auxiliary fluid used for example in flushing or final purification operations before removal of a high-purity product. In this example, the axes of the orifices always meet an orientation and distribution criterion such that the fluid passing through strikes a solid part of a chamber wall.

FIG. 11 shows an embodiment of a DME in which mixing chamber 60 is located on one side of the DME and thus has a common wall with one of the lengthwise walls of column 1. It is provided on the side of collecting space 4 with at least one orifice 61 for passage of main fluid $A_1$, with this orifice having for example characteristics substantially similar to those of orifices 14 (FIG. 1) and with one or more calibrated orifices 62 for passage of the mixture, these orifices having, for example, characteristics identical to the characteristics of orifices 17 (FIG. 1).

The two injection and/or removal chambers 63, 64 of the two secondary fluids $B_1$, $B_2$ are positioned on one side of this mixing chamber 60, for example, along a wall whose direction is substantially parallel to the column axis, said chamber 63 being disposed above chamber 64 for example. The injection and/or removal chambers communicate with the outside through conduits such as conduits 12, 13 not shown for reasons of clarity and communicate with mixing chamber 60 through one or more orifices 65, 66 determined by criteria similar to orifices 15 and 16 (FIG. 1), for example.

When the column has a substantial section, it may be useful to equip it with several DMEs and insert means for supporting these DMEs.

It is advantageous to dispose several DMEs side by side for example rather than a single DME whose size would be substantially identical in size to the group of these DMEs in the column but would lead to greater difficulties in reduction to practice, particularly mechanical difficulties. Because of the independence of the secondary fluid injection and/or removal chambers, such an arrangement may lead to a non-negligible number of tubes or conduits passing through the wall or walls of the column and possibly encumbering the column and increasing its complexity. In this case, it proves useful to adopt a configuration for the incoming secondary fluid tubes according to a disposition shown in FIGS. 12, 13, 14, and 15 for example.

In these figures, the various tubes Ci allowing a secondary fluid with a specified nature to be injected and/or removed are joined inside the column near a tube or conduit C. Only main conduit C passes through the column walls at one or more points.

For example in FIGS. 12 and 13, conduits C and C' allow fluids $B_1$ and $B_2$ respectively to be injected and/or removed, having branches Ci and C'i for passage of secondary fluids to the appropriate injection and/or removal chambers. "Appropriate chamber" means the chamber designed to receive, in both the removal stages and the injection stages of the secondary fluids, one fluid and one fluid only, or possible fluids that are compatible with each other.

In FIG. 13, one section of the column is equipped with three DMEs D1, D2, D3 positioned side by side and each having characteristics identical to those of the DME described in FIG. 1 for example. Each has at least one mixing chamber M and two injection and/or removal chambers $I_1$ and $I_2$ located on either side of mixing chamber M.

Main conduits C and C' are disposed, for example, above the DMEs as shown in FIG. 12, horizontally and in a radial direction for example, and branches Ci, C'i leave from main conduits C and C' in a substantially perpendicular direction for example to rejoin injection and/or removal chambers of types $I_1$, $I_2$ respectively. Of course, without departing from the framework of the invention, the horizontal or vertical arrangement of these conduits and their branches, as well as their geometry, depend on the mode and position of the column—for example the latter could be used horizontally or vertically—and the disposition of the DMEs inside.

In the same way, it is possible to conceive of superposing the main injection conduits C and C' by adapting the shapes of the branches from the main conduit positioned one above the other, or any other alterative embodiment.

FIGS. 14 and 15 show a diagram for distribution of secondary fluids minimizing the difference in travel times between the point of entry of the fluid into the distribution circuit and its injection point into the injection and/or removal chamber.

For a column with, as in FIG. 13, three DMEs disposed side by side, external conduit 70 dedicated to fluid $B_1$ is extended inside column 1 by a part of conduit 71 that is circular in shape, for example, over at least part of its length and assumes the shape of the periphery of the DME, its length being adjusted to reach and distribute fluid $B_1$ in all the injection and/or removal chambers $I_1$ dedicated to fluid $B_1$ through branches, for example pieces of conduit 71I.

The same applies to consideration of the injection and/or removal conduit of fluid $B_2$ which is distributed through conduit 72 extended by the piece of circular conduit 73 which itself branches into pieces of conduit 73I terminating in the various injection and/or removal chambers.

According to certain arrangements, instead of two injection and/or removal semi-circuits, two circular circuits are disposed for example one above the other.

In FIGS. 14 and 15, the two injection and/or removal conduits 70, 72 are shown in opposite parts of the periphery of the column.

This arrangement offers the particular advantage of considerably simplifying the arrangement of the internal connecting conduits to the DMEs, while leaving a maximum amount of space for the beds of screens or granular solids located on either side of the DME while minimizing disturbance to the circulation of main fluid $A_1$ through these beds.

The various principal circular conduits disposed inside the column can have lengths corresponding to part of, or be substantially equal to, the circumference of this column. They can also be disposed one above the other.

The number of transverse common conduits, whether rectilinear or not, is chosen as a function, for example, of the number of DMEs positioned inside the column and the number of secondary fluids desired to be independent.

Because of the independence of the secondary fluid injection and/or removal circuits, the arrangement of the injection and/or removal conduits common to the branches can be of any shape without requiring any symmetry of shape or residence time.

FIGS. 16, 17, and 18 show examples of arrangements particularly suitable for large-diameter or large-section columns, which consist of disposing supporting means or means whose function is to ensure transportation of the DMEs to improve the mechanical stability of the whole.

FIGS. 16 and 17 show a column provided with a mechanical assembly able to support the DMEs. The assembly is, for example, in the shape of a beam Pc preferably disposed along the lengthwise axis A of column 1, or the central beam, whose length is substantially identical to the length of the column. The beam can have any section, but this section must be sufficient to improve the mechanical stability of the whole.

FIG. 18 shows schematically the arrangement of several beams Pc distributed in the column, according to the lengthwise axis.

One or more main beams Pp are disposed such as to be integral with the central beam or central tube of FIG. 16 or with the various beams Pc distributed over a section of the column, for example as shown in FIG. 18. The beams are, for example, embedded in the beds of granular solids. Such an arrangement in particular reduces the risk of bending of the main beam, and allows to reduce their size.

The DMEs rest on the main beams and are thus supported by the latter.

FIG. 17 shows a circular means of support disposed near and along the circumference of the column wall, for example receiving the walls of the DMEs that are closest to the outer wall of the column.

Advantageously, the DMEs are disposed relative to each other such as to produce an optimal seal of the assembly to compel the fluid to flow essentially through the collecting space and through the mixing chamber of the DME.

For this purpose, the DMEs are assembled along a column section side by side, by resting, for example, on the ring or circular support disposed at one column section, central beam or central tube Pc, and main support beams P distributed at one column section, when they exist.

The space between two neighboring DMEs is for example approximately 10 to 20 mm.

To produce a seal between the outer walls of two neighboring DMEs, and/or between the internal wall of the column and the DMEs disposed in the vicinity of this wall, the existing space is filled by sealing means, for example a sealing braid Te whose size is sufficient to achieve essentially total tightness. Several braids could also be disposed one above the other to seal the assembly (FIG. 19).

This produces improved efficiency of the DME, as all or most of the fluid passes entirely or essentially in totality through at least one of the mixing chambers of one of the DMEs disposed along the column section.

The seal thus obtained also maintains the integrity of the screen bed as charged initially, which contributes to improving the structural stability of the screen over time.

Indeed, when no seal is produced, the screen or the particles forming the bed disposed above a DME can flow of the space separating two DMEs. At the flow level of the bed, a cavity is then created which can propagate and cause successive flow of particles through the screen located above the cavity, creating a sort of chimney in which charging of the bed is thinner and the bed is "decompacted", contrary to the rest of the bed which retains its dense charging form. If the seal is not produced, this flow can propagate from one bed to the next. As a result, there is a preferential passage for the circulating fluid, which is prejudicial to the efficiency of the process, the purpose of which is to achieve substantially uniform flow throughout the section of a bed, of the piston type for example.

The number of DMEs disposed in a column section is not limited.

According to one preferred embodiment of the invention, the DME has a rectangular shape, with a width varying for example from 600 to 1200 mm so that DME can easily be arranged inside the column, and preferably between 900 and 1100 mm. The DMEs disposed near the column walls have at least one wall whose shape is adapted to that of the column.

By choosing a rectangular shape for the DME, the number of DMEs per column section is for example fourteen DMEs for a column with a diameter of approximately 7.5 m, twenty DMEs for a diameter of approximately 10 m, and ten DMEs for a diameter of approximately 5 m.

When the secondary fluid injection and/or removal operations cease, a weeping phenomenon may result from a dynamic effect of circulation of main fluid $A_1$ in front of the orifices. This phenomenon occurs particularly at the calibrated orifices related to the secondary fluid circuit affected by this cessation.

For example, when circulation of fluid is interrupted in chamber 5, the latter is filled totally with secondary fluid $B_1$ for example.

Main fluid $A_1$, for its part, continues to circulate at high speed in mixing chamber 7 and passes in particular in front of the calibrated orifices that connect the mixing chamber with the injection and/or removal chamber. Because of the existence of turbulence of fluid $A_1$ in the mixing chamber, there may be a weeping phenomenon, namely a very small quantity of the main fluid will enter the injection and/or removal chamber through the calibrated orifices and conversely a very small quantity of the secondary fluid present in the injection and/or removal chamber will escape from this chamber to the mixing chamber.

When the main and secondary fluids are of different kinds, there is a possibility of mutual contamination, while there is no flow of secondary fluid $B_1$.

To limit or even eliminate this risk of mutual contamination, it is possible to use suitable devices or choose specific arrangements within the DME.

A first way to proceed is to minimize the size of the calibrated orifices located between the mixing chamber and the injection and/or removal chambers, for example by choosing a size of less than approximately 10 mm, preferably 7 mm, and if possible preferably less than 5 mm in order to minimize the extent of this weeping phenomenon.

One of the possible arrangements consists, for example, in avoiding provision of secondary fluid injection and/or removal orifices opposite the flow of main fluid in the mixing chamber (axis of orifices parallel to the direction of the main fluid) or avoiding using a mixing chamber whose shape could create a nozzle or venturi effect with these orifices.

A particularly useful arrangement, shown in FIGS. 20 and 21, consists of associating with injection and/or removal chamber 5, 6 an injection and/or removal prechamber 55, 66 positioned between mixing chamber 7 and injection and/or removal chamber 5, 6.

Each of the injection and/or removal prechambers 55, 66 has one or more calibrated orifices 15A, 16A which are essentially identical to the calibrated orifices described above and allow passage of fluids between an injection and/or removal chamber and a prechamber, in addition to orifices 15, 16 which allow circulation of fluids from the mixing chamber to the prechambers. Orifices 15, 16, 15A, 16A are for example disposed relative to each other along offset axes to avoid problems of secondary fluids of different types meeting each other, as discussed above. Such an arrangement is particularly useful because it has in particular the following advantages:

when a secondary fluid $B_1$, for example, is injected, the calibrated orifices of the prechamber lead to better equalization of the pressure prevailing inside the prechamber and thus to better distribution of secondary fluid $B_1$ through the second series of calibrated orifices 15, 16 allowing the secondary fluid to pass from a prechamber to the mixing chamber.

the reduced volume of the prechamber provided with calibrated orifices, 15, 15A, 16, and 16A respectively, constitutes a confined space that confines the phenomena of weeping and mutual contamination of the fluids, essentially to the interior of this prechamber when circulation of secondary fluid is stopped. This is because the wall common to the mixing chamber and the prechamber provided with calibrated orifices acts as an obstacle, preventing turbulence created by the main fluid from propagating in the injection and/or removal chamber dedicated to a secondary fluid.

For this reason, the volume of this prechamber is preferably minimized. The width between walls is between 10 and 100 mm for example, and preferably between 15 and 50 mm and still more preferably between 20 and 30 mm.

The mixing prechamber can also advantageously be used to carry out flushing operations by injection of secondary fluid, or removal of main fluid.

For example, if main fluid $A_1$ is a clean product and there are risks of weeping, namely risks of contamination of the volume contained in this prechamber by injecting a volume of fluid $B_1$ equal to or greater than the volume of the prechamber, the contaminated volume is pushed into the mixing chamber and thus clean fluid is obtained in the prechamber.

Conversely, by removing a reduced volume of a secondary fluid $B_2$, for example a quantity at least equal to the volume of the prechamber, the prechamber is flushed with main fluid $A_1$.

Figure 22:
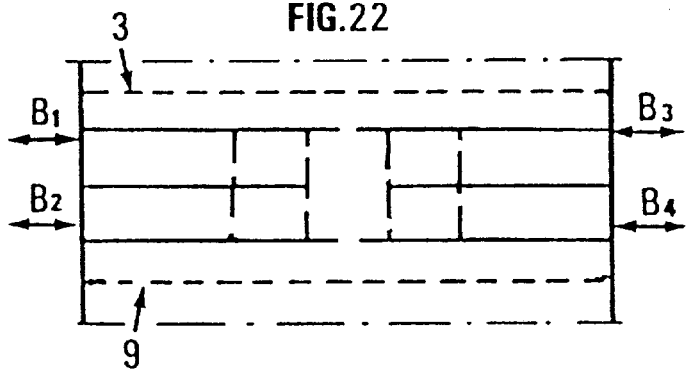

FIG. 22 shows a variant of the DME in which four injection and/or removal chambers and their associated prechambers are disposed on either side of the column axis.

Figure 23:
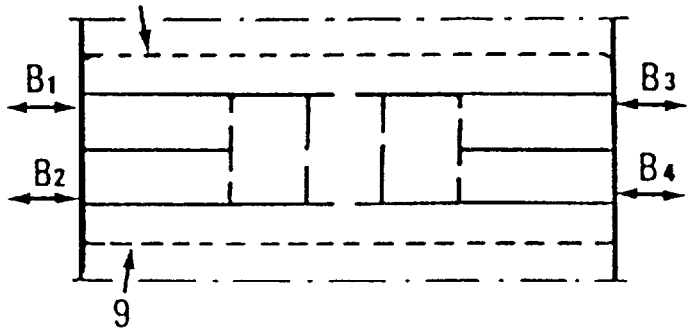
Figure 41:
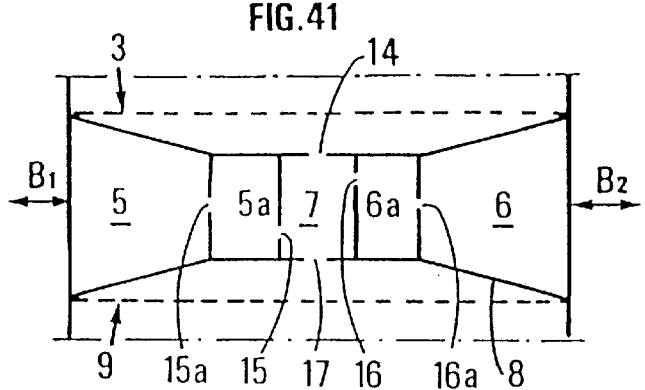
Figure 42:
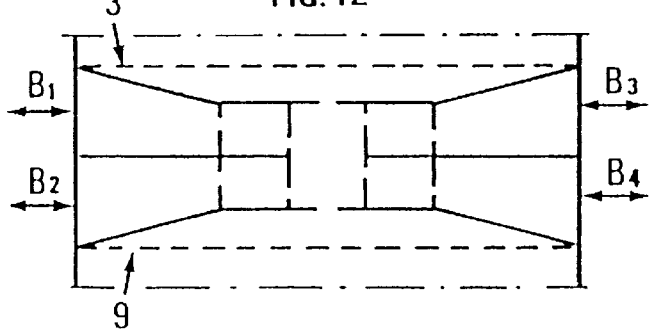
Figure 43:
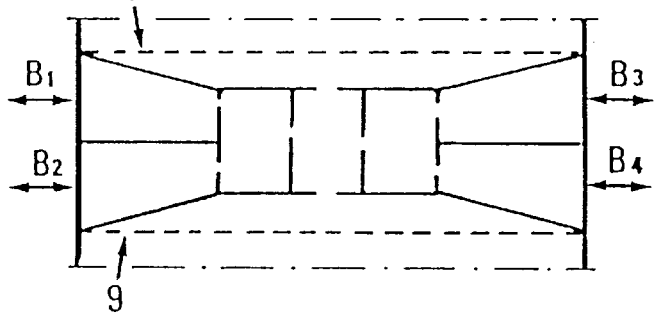

FIGS. 23 and 24 show schematically two other embodiments of the DME for which several injection and/or removal chambers are associated with a single prechamber.

In this case, each of the injection and/or removal chambers is always "dedicated" to a single fluid but the associated prechamber can see different fluids.

These embodiments have in particular the following advantages:

risks of the weeping phenomenon are minimized by comparison with arrangements having several prechambers since the number of calibrated orifices has been minimized, clean secondary fluid is used to flush the common prechamber, conversely, when a volume of secondary fluid greater than or equal to the volume of the common prechamber is removed, flushing of this common prechamber with the main fluid is achieved in a single step, which can advantageously be done when the main fluid becomes clean.

Advantageously, the DME according to the invention has collecting means and/or redistribution means with a shape designed to minimize differences in travel time between the lines of fluid circulating in the beds of granular solids. Alternative embodiments of devices are described as non-limiting examples in FIGS. 25 to 43.

For example, to homogenize the travel times of the lines of main fluid circulating in first upper bed 2 located upstream of the DME, the collecting space shown in FIG. 25 has a shape different from that of FIG. 1.

The collecting space 4 assumes a shape delimited by:
walls 4a and 4b formed, for example, partly by the upper wall of mixing chamber 7,
the upper walls of injection and/or removal chamber 5, 6, said walls 4a and 4a being separated by opening 14, grid 3, and
the walls of the column The main fluid circulates in upper bed of granular solids 2 in the form, for example, of a piston of fluid from the bed, particularly in the specific shape of the collecting space, passes through collecting grid 3, then traverses collecting space 4 while flowing over walls 4a and 4b before penetrating mixing chamber 7 through orifice 14. The shape of walls 4a and 4b is designed for the travel time of the lines of fluid Fi of the main fluid taken between its introduction point on the column and its point of entry into the mixing chamber through opening 14, is substantially identical for all the fluid lines or for all the fluid particles through the bed and the collecting space, whatever their radial position of introduction into the bed. Mixing chamber 7 is disposed substantially in the center of the column for example, and opening 14 is located substantially along its axis A. The two walls 4a and 4b of the collecting space have a slope defined to obtain the sought-after result, namely minimizing the differences in travel time between the various flow lines.

It is also possible to optimize the shape of the collecting space to achieve the greatest possible uniformity in the propagation times of the various fluid lines, taking into account for example the nature of the granular solids of which the beds are composed, which may have an effect on the propagation rate of the fluid lines due to possible interactions between the fluid and the particles of which the bed of granular solids is composed.

This is because fluid Fb collected at the edge of the DME and hence toward the outer walls of the column covers the greatest distance in the collecting space before reaching the opening of the mixing chamber; this increase in path length by comparison with central fluid Fc is compensated by the shape, inclined for example, of wall 4a whose angle of inclination is calculated as a function for example of the collected flow passing through each point in the collecting space.

The secondary fluid passes from the injection and/or removal chamber to or from the mixing chamber via orifices 15 in order to mix with the main fluid. The mixture $A_2$ thus formed is then evacuated through calibrated orifice 17 and redistributed by the collecting means, comprising for example a collecting space 8 and a redistribution grid 9, to second bed of granular solids 10.

The advantageous shape of the collecting space, minimizing differences in travel time between the various fluid lines, avoids drag effects for the propagation front of the main fluid. This drag or delay effect of one fluid line relative to another is particularly injurious to the quality of chromatographic separation obtained through the bed of granular solids and is equivalent to a back-mixing phenomenon.

The collecting space is conical in shape for example, but can also assume any shape suitable for homogenizing the travel times of the fluid lines starting from its level N of injection into the column and until the time it penetrates into the mixing chamber.

FIG. 26 describes another embodiment where the shape of the collecting grid is also designed to decrease the differences in travel time. The length of the first bed, for example, traversed by fluid lines Fi and located upstream of the DME, is designed to obtain a cumulative passage time or travel time taking into account the granular bed and the collecting space where it exists, which is substantially equal for all the particles of the main fluid.

In FIG. 26, grid 3 has the shape of, for example, a conical section or bowl, or has over at least part of its length shapes similar to inclined planes or any other shape that can elongate the length of the bed in its central part and also can adjust the path length of the fluid lines depending on their circulation path inside the column. For example, an additional path length Li is added to each of fluid lines Fi in the central position in this embodiment. The additional length Li of the bed decreases for example from the center of the column to the column walls.

FIG. 27 describes another embodiment in which the shapes of grid 3 and collecting space 4 combine to product an essentially identical travel time for all the fluid lines Fi whatever the position of their path in the column. For example, the length of the first bed traversed by fluid lines Fi is adjusted and placed upstream of the DME such as to obtain a cumulative travel time, taking into account the granular bed and the collecting space where this exists, that is substantially the same for all the particles of the main fluid.

In FIG. 27, grid 3 has the shape of, for example, a conical section or bowl, or has over at least part of its length shapes similar to inclined planes or any other shape that can elongate the length of the bed in its central part to adjust the path length of the fluid lines depending on their circulation point inside the column. For example, an additional path length Li is added to each of fluid lines Fi for example; in this embodiment, the additional length Li of the bed decreases from the center of the column toward its edges.

In addition, in order to decrease the residence times of the main fluid in the collecting space, the height h of this space is preferably chosen so that it decreases from the center of the DME to the edges of the DME, which decreases dead volumes and travel times.

The height h is chosen as between 5 and 50 mm for example and preferably between 5 and 30 mm, for a space with a conical or bowl shape or having inclined walls.

In certain cases, the shape of the grid itself may suffice.

This produces near-perfect correction of the travel times of the various fluid particles or lines circulating through upper bed 2 before penetrating into the mixing chamber.

In all the embodiments cited above, the collecting space can have an essentially constant height h.

FIGS. 28 and 29 show schematically examples of arrangement of the collecting space combining means of separating the fluid lines into several sub-flows with specific shapes of the walls 4'a and 4'b of collecting space 4.

For example, the arrangement of FIG. 28 consists of inserting into collecting space 4 a plate 81 provided with at least two, for example, orifices 82 and 83, said plate being disposed substantially centrally in the DME and orifices 82 and 83 being located at substantially the same distance from the axis of the column which corresponds to the axis of the DME.

In this way, a first collection is made of the main fluid lines, which has the function of decreasing differences in travel times. This is because the fluid lines Fb circulating toward the edge of the DME and the fluid lines Fc circulating toward the center axis of the DME flow tangentially over plate 81 from the center of the column or from one of its walls, covering an essentially identical distance but reduced by half, before passing through orifices 82 or 83 and before terminating in a collecting sub-space 4' delimited by plate 81 and walls 4'*a* and 4'*b* formed at least in part by the upper walls of mixing chamber 7 and the walls of injection and/or removal chambers 5, 6, before penetrating mixing chamber 7 through orifice 14. In this embodiment, orifices 82 and 83 are positioned essentially ¼ and ¾ of the way along the plate in the direction of the width of the DME.

The combination of plate 81 and of the collection through two openings 82, 83 substantially decreases by half the differences in travel time between the fluid lines relative to a collector not equipped with this device.

Another procedure shown in FIG. 29 consists of positioning, at collecting space 4, a plate having four inclined portions or surfaces 91*a*, 91*b*, 91*c*, and 91*d*. Inclined surfaces 91*a* and 91*b* form a first collecting space 92 which is conical or bowl-shaped for example, having at least one passage opening 93, while inclined surfaces 91*c* and 91*d* form a second collecting space 92' having at least one passage opening 94. Openings 93 and 94 communicate with a space 4' delimited by walls 4'*a* and 4'*b* extending inclined surfaces 91*a* and 91*d*.

The main fluid lines circulate along inclined surfaces whose angle of inclination is chosen to homogenize, at least in a first step, the travel times of the various fluid lines before they pass through orifices 93 and 94, the final step of minimization being effected due to the shapes of walls 4'*a* and 4'*b*.

According to one advantageous embodiment of the device according to the invention, the DME also has a space 8 for redistributing the mixture coming from mixing chamber 7 through opening 17, the shape of which is preferably designed so that all the fluid lines of which it is formed, or the particles, reach bed 10 located downstream of the DME at approximately the same time. The travel times of the fluid lines from the point corresponding to opening 17 up to collecting grid 9 are substantially identical.

This redistribution space has, for example, characteristics at least substantially identical to one of the embodiments described in FIGS. 25, 26, 27, 28, and 29 for the collecting space.

The redistribution space has a shape or a geometry that is for example substantially identical to that of the collecting space to minimize dead volumes and turbulence. Its height varies for example from 5 to 50 mm, preferably from 5 to 30 mm, and preferably from 15 to 20 mm, and it can have any shape, rectangular or conical for example.

Its height can be essentially constant or can decrease, for example, starting from the center of the DME and proceeding toward its edges, which minimizes dead volumes and travel time.

In FIG. 30, the mixture redistributing means comprise a redistribution space 8 delimited, for example, by two inclined walls 8*a* and 8*b* which are formed, for example, by part of mixing chamber 7 and the walls of injection and/or removal chambers 5, 6, and collecting grid 9 positioned just above second bed 10, or the second bed when the collecting grid is absent from the device.

The shape of the redistribution space is defined for example substantially identically to that of the collecting space mentioned above with reference to FIG. 25.

The redistribution space is preferably designed to minimize dead volumes and turbulence. Its height ranges for example from 5 to 50 mm, preferably from 5 to 30 mm, and it can have any shape, for example rectangular or conical.

FIGS. 31 and 32 show two embodiments for which the shape of redistribution grid 9 and the shape of redistribution space 8 cooperate to effect a decrease in the differences in travel time of the fluid lines from the mixing chamber up to the point of their introduction into the second bed.

The height h of the redistribution space 9 on FIG. 31 is substantially constant.

FIG. 32 shows an embodiment in which height h of the redistribution space decreases starting from the center of the DME and proceeding toward its edges, which minimizes dead volumes and travel times.

FIGS. 33 and 34 show specific arrangements for the redistribution space that are substantially identical to the arrangements of the collecting spaces of FIGS. 28 and 29.

FIGS. 35, 36, 37, and 38 show schematically embodiments of the DMEs described in FIGS. 4, 7, 10 and 11 where the difference lies particularly in the shapes and geometries of the collecting and redistribution spaces which are designed to minimize differences in travel time between the fluid lines before their entry into the mixing chamber and the fluid lines coming from this mixing chamber which will continue their flow into the second bed of granular solids disposed downstream of the DME.

Of course, in the case of columns with substantial sections, the distribution and shape of the DMEs can be chosen according to one of the embodiments described in application WO-95/03867.

Figure 44:
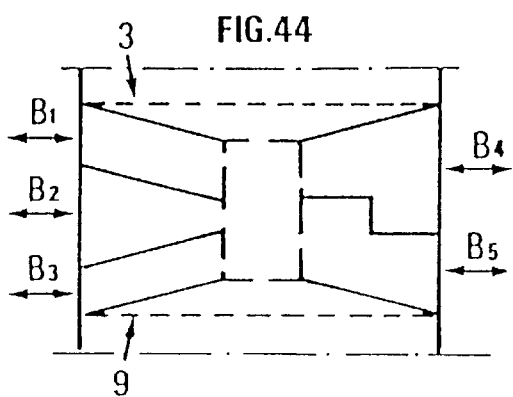
Figure 45:
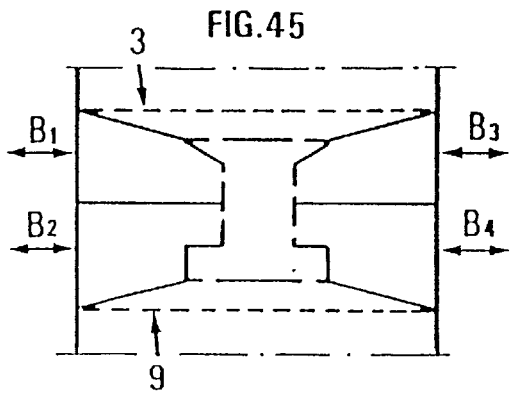

The mixing chambers can assume substantially elongate, generally rectilinear, curved, or angled shapes over at least one of the parts shown schematically for example in FIGS. 44 and 45.

FIGS. 46, 47, 48, 49, and 50 show in detail five examples of specific shapes for the mixing chambers. In all these examples, the choice of shape has the main goal of optimizing the mixing function of the chamber.

Figure 46:
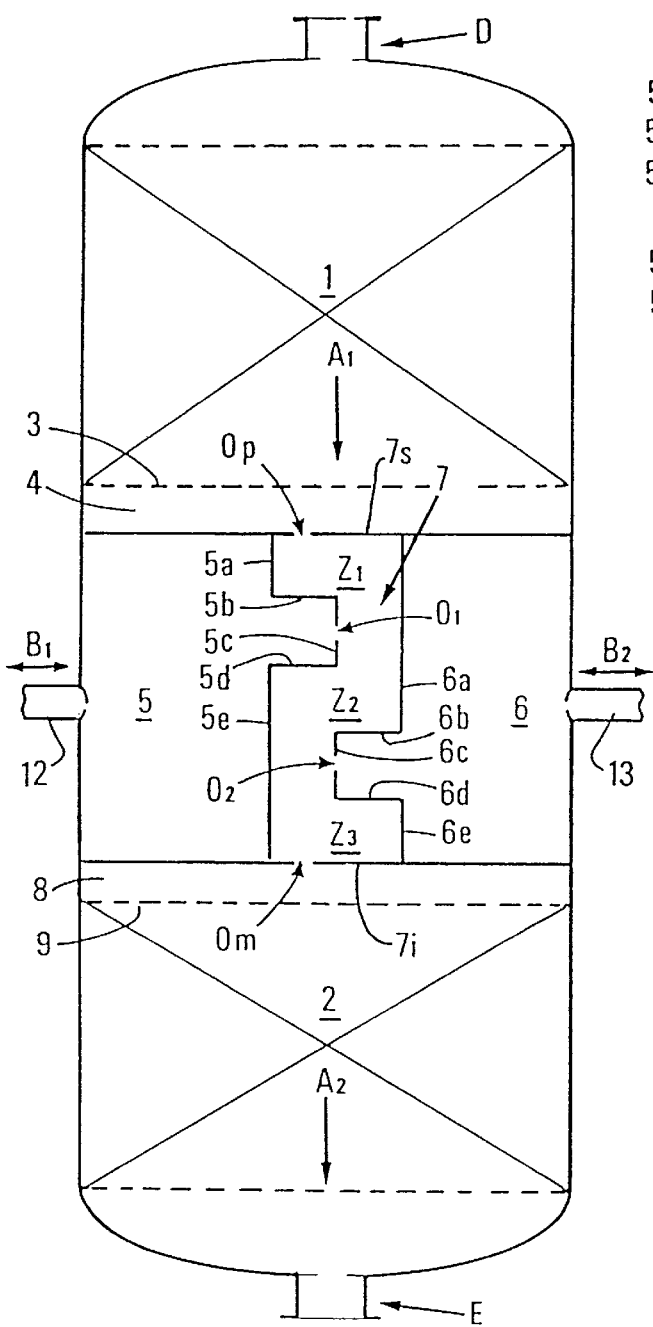
FIG. 46 shows schematically the DME of FIG. 1 with a mixing chamber whose shape is designed to optimize the mixing function.

In FIG. 46, mixing chamber 7 has a common wall with first injection and/or removal chamber 5, which has for example parts (5*a*, 5*b*, 5*c*, 5*d*, and 5*e*) and a second common wall with second injection and/or removal chamber 6, composed for example of five parts (6*a*, 6*b*, 6*c*, 6*d*, and 6*e*).

Mixing chamber 7 has an upper wall 7*s* and a lower wall 7*i* located, for example, respectively in the extensions of the upper walls, and lower walls of injection and/or removal chambers 5, 6 which respectively delimit, with collecting grid 3, the outer walls of the column, and collecting space 4, while the lower wall delimits, with redistribution grid 9, the outer walls of the column, and redistribution space 8. The upper wall of chamber 7 is provided with one or more orifices Op for passage of the main fluid circulating downstream of the DME through, for example, the main bed of granular solids and its lower wall has one or more orifices Om that allow the mixture or remixture of the fluid created inside said chamber 7 to exit toward the redistribution cspace.

The walls common to each of the injection and/or removal chambers 5, 6 and mixing chamber 7 are provided with one or more orifices Oi (the index i corresponds, for example, to the number of the secondary fluid) allowing the fluids to pass, for example the main fluid and/or the various secondary fluids $B_1$, $B_2$ between one injection and/or removal chamber and the mixing chamber.

Thus, for example, part 5 has an orifice or a series of orifices Oi whose axis is oriented such that a first secondary fluid $B_1$, for example, coming from injection and/or removal chamber 5, strikes a solid part of the wall common to the mixing chamber 7 and to second injection and/or removal chamber 6, said wall (for example 6a, 6b) being located, for example, opposite to the solid part of the chamber 5, substantially on the axis of orientation of the orifice.

The wall common to mixing chamber 7 and second injection and/or removal chamber 6 has identically, disposed for example in a solid part 6c, one or more orifices $O_2$ whose axis is oriented such that the second secondary fluid coming from the second injection and/or removal chamber strikes, for example, solid wall 5e of the wall common to the mixing chamber and the first injection and/or removal chamber.

Once it has struck the wall, the fluid then disperses in the main fluid or in the fluid circulating in the mixing chamber. By this method, mixing of the fluids inside the chamber is optimized.

The shapes of the walls common to an injection and/or removal chamber and to the mixing chamber is chosen to define, for the fluid or the mixture circulating in the chamber, a particular path, which favors its mixing throughout its travel.

Thus, the main fluid injected through opening op circulates in a first zone $Z_1$ of the chamber delimited by substantially parallel walls 6a, 5a and wall 5b extending wall 5a making an angle of approximately 90° C. to narrow the flow zone of the main fluid in order to channel it between the two substantially parallel walls 5c and 6a. The first main fluid $B_1$, introduced through conduit 12, passes into first injection and/or removal chamber 5 and is then injected toward mixing chamber 7, for example through orifices $O_1$ located in part 5c of the first common wall. The orientation of the orifice or orifices $O_1$ allows this first secondary fluid $B_1$ to be injected in a direction substantially perpendicular to the flow direction of the main fluid, and also such that it strikes a solid part of the second common wall, opposite the first wall. After striking the second solid wall, the fluid passing through the orifice disperses in the fluid circulating in the chamber. Its dispersion may generate turbulence phenomena in the chamber, optimizing its mixing with the main fluid and/or the fluids present in the mixing chamber. The shape of the mixing chamber delimited at least by walls 5d, 5e, 5f, and 6b, 6c, 6d, 6f and by lower and upper walls 7i and 7s is advantageously chosen to improve the mixture so produced.

Injection of a second secondary fluid inside the chamber is for example affected in sequence with injection of the first fluid but according to a substantially identical principle.

Thus, in a substantially similar manner, with the main fluid circulating along a path similar to the path referred to above, the second secondary fluid is introduced into the second injection and/or removal chamber 6 through conduit 13 which penetrates the mixing chamber, for example through one or more orifices $O_2$ located in part 6c of the second common wall in the mixing chamber. This second fluid strikes for example the solid part 5e of the first common wall before dispersing within the fluid circulating in the chamber.

The resulting mixture $A_2$ of the main fluid and at least one of secondary fluids $B_1$, $B_2$ leaves the mixing chamber via orifice Om before being distributed through redistribution space 8 and distribution or redistribution grid 9 in the second bed of granular solids located downstream of the DME.

The parts 5i (5a, 5b . . . ) and 6i (6a, 6b . . . ), common to the chambers are connected with each other and extend to form, with the lower and upper walls of the mixing chamber, a mixing space or chamber whose shape is optimized to mix several fluids or remix one fluid.

The orientation of the axes of the orifices for injecting and/or removing the fluid into or from the mixing chamber is chosen to advantageously avoid passage of secondary fluids through orifices communicating with chambers not dedicated to them. This avoids any problem of contamination of the injection and/or removal circuits (chamber and associated conduit) arising from utilization of secondary fluids with different natures, contrary to the case where a single injection and/or removal circuit common to the various fluids is used.

The inlet orifices $O_p$ of mixing chamber 7 are for example series of calibrated holes or calibrated slots, preferably regularly spaced to effect collection of main fluid $A_1$ toward mixing chamber 7 as uniformly as possible.

The size and geometry of these orifices are chosen so that the fluid, at the entry point of the mixing chamber, has a speed favorable for creating turbulence inside and at the same time for producing a pressure drop allowing this turbulence to be confined inside the mixing chamber.

Thus, the spacing between the fluid $A_1$ inlet orifices $O_p$ is, for example, between 30 and 150 mm and preferably between 50 and 100 mm. The flowrate of the fluid through the orifices obtained with such a spacing varies from 1 to 5 m/s for example, preferably from 2 to 3 m/s. The pressure drop thus created at the outlet of the orifices is between 10 and 100 $g/cm^2$ and preferably between 30 and 60 $g/cm^2$.

The outlet paths Om of a fluid from the mixing chamber are, for example, formed by a series of holes or slots, preferably regularly spaced in order to redistribute the fluid coming from the mixing chamber as uniformly as possible to redistribution space 8. This fluid results from the mixing of at least one main fluid with at least one secondary fluid.

In this way, collection and proper distribution of the fluid coming from the mixing chamber and passing into redistribution space 8 and thence through grid 9 is optimized when this grid is present.

Inlet and outlet orifices $O_p$ and $O_m$ located at mixing chamber 7 are preferably disposed alternately or in a staggered arrangement to favor transverse dispersion of main fluid $A_1$ and secondary fluids $B_1$, $B_2$ mixed together. These orifices are preferably disposed as uniformly as possible with, for example, the same pitch or spacing between them.

Likewise, the arrangement of these orifices is chosen to avoid nozzle or venturi effects in the chamber resulting for example from high-speed circulation of fluid in the mixing chamber.

Orifices $O_1$, $O_2$ for introduction or removal of secondary fluids $B_1$, $B_2$ are for example formed by a series of holes, preferably regularly spaced to inject and/or remove these secondary fluids as uniformly as possible into and/or from mixing chamber M. These orifices are preferably calibrated and sized, for example, so that the linear velocity of the fluid injected into the inlet of the mixing chamber is high enough to create turbulence inside the mixing chamber and to create a significant pressure drop.

The fluid flowrate through passage orifices $O_1$, $O_2$ is for example between 1 and 15 m/s, preferably between 5 and 10 m/s. The spacing between the holes is, for example, between 30 and 150 mm and preferably between 50 and 100 mm. The corresponding pressure drop varies between 100 and 2000 $g/cm^2$ and preferably between 200 and 1000 $g/cm^2$.

The orifices or series of injection and/or removal orifices $O_1$, $O_2$ are for example preferably disposed relative to the inlet orifices $O_p$ so that the fluid injected through one of these orifices mixes with the main fluid circulating in the mixing chamber, and is then redistributed in two fluids through outlet orifices Om disposed for example alternately or in a staggered arrangement relative to orifices $O_p$, $O_1$, and $O_2$.

The geometry and dimensions of the injection and/or removal chambers 5, 6 are chosen to provide a substantially identical fluid flowrate through all the outlet orifices. For example, the ratio between the developed length of said chambers and their average or equivalent width is less than 30 and preferably less than 20, and preferably less than 10.

Moreover, the dimensions of these chambers are designed to allow the secondary fluid to strike a solid part of a wall to favor dispersion within a fluid circulating in the chamber, and its mixing with the fluid.

Figure 47:
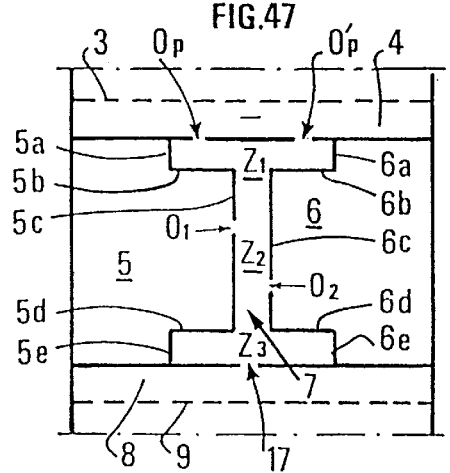
FIG. 47 shows another embodiment wherein the mixing chamber is provided with several series of orifices for introduction of a circulating fluid downstream.

According to another embodiment described in FIG. 47, upper wall 7s of the mixing chamber is provided with, for example, at least two series of orifices $O_p$, $O_p'$ distributed for example over substantially the entire length of the mixing chamber and having characteristics substantially identical to those of the orifices given above.

In this embodiment, mixing chamber 7 is substantially symmetrical relative to the center axis of the DME and is formed for example by two walls having, respectively, parts 6a, 5a extending substantially along the axis of the DME and extended by walls 6b, 5b in order to narrow the width of first zone $Z_1$ of mixing chamber M. Walls 6b, 5b are themselves extended by walls 6c, 5c respectively in a direction substantially parallel to the lengthwise axis of the DME and thus define a second zone $Z_2$ in the shape of a duct for example. Zone $Z_2$ is itself extended by a zone $Z_3$ delimited by walls 6d, 5d extended by walls 6e, 5e. The angles between two successive walls are substantially equal to 90° C. for example.

This group of three mixing zones $Z_1$, $Z_2$, and $Z_3$ forms a mixing space or chamber sized and shaped to optimize the mixing of several fluids or remixing of one fluid inside the chamber.

Walls 6c and 5c are provided with one or more series of orifices $O_1$, $O_2$ for passage of fluids between the mixing chamber and the injection and/or removal chambers.

The passage orifices of the various fluids, main fluid, secondary fluids, and mixture of several secondary fluids with the main fluid or fluid remixed inside the chamber when no other secondary fluid is injected into the DME, have characteristics substantially identical to the characteristics assumed by the orifices described above, in relation to FIG. 1 for example.

At least one of zones $Z_2$, $Z_2$, and $Z_3$ can be equipped with turbulence-promoting means.

Figure 48:
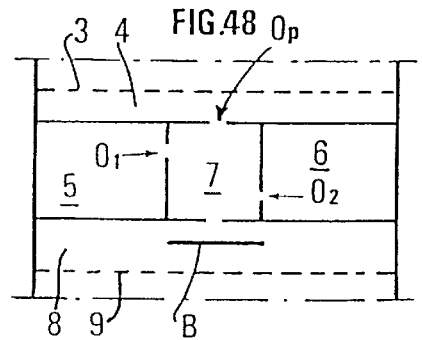
FIG. 48 shows schematically an embodiment of the device according to the invention combining mechanical means such as anti-splash plugs located at the redistribution space.

FIG. 48 shows schematically one variant embodiment of the device according to the invention equipped with means such as an anti-splash plug B located at redistribution space 8, preferably for example opposite outlet orifice or orifices $O_m$. The shape and size of the anti-splash plug will be adjusted to the number and distribution of outlet orifices $O_m$ distributed in the lower wall of mixing chamber 7.

Such an arrangement prevents the fluid from directly striking bed of granular solids 10 located downstream of the DME.

Moreover, the radial distribution of the fluid coming from the mixing chamber into redistribution space 8 is also improved.

Without departing from the framework of the invention, the anti-splash plug or any means with an identical function is disposed for example at the collecting space essentially on the axis of the fluid inlet orifice or orifices, preferably opposite the inlet orifice, which has the effect in particular of spreading distribution of the fluid from the collecting grid within the collecting space. This prevents pronounced turbulence phenomena in the vicinity of the first bed of granular solids and favors collection of the main fluid.

Figure 49:
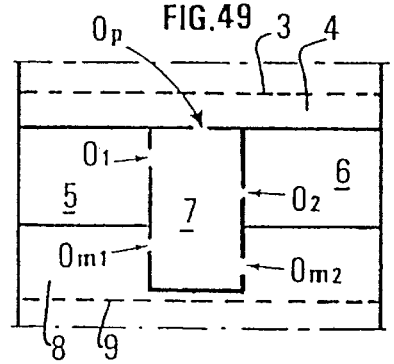
FIGS. 49 and 50 show schematically two embodiments of the mixing chamber whose two walls extend over at least part of a redistribution space disposed downstream of the device.
Figure 50:
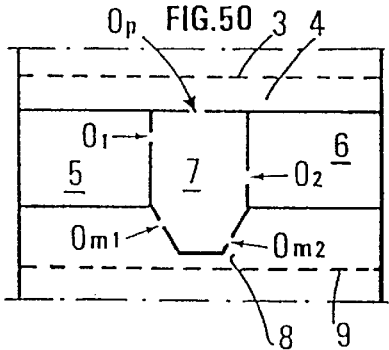

Another alternative embodiment of the device allowing a similar effect to be achieved is shown schematically in FIGS. 49 and 50.

In FIG. 49, the first and second walls common to mixing chamber 7 and to injection and/or removal chambers 5, 6 extend over at least part of their heights into redistribution space 8.

The orifices or series of orifices $O_{m1}$ and $O_{m2}$ are positioned in this embodiment on each of the extensions of the first and second common walls, on either side for example.

In this way, the fluid or mixture coming from the mixing chamber is divided into two flows before being distributed in the redistribution space, which allows better distribution of this fluid before it passes through the redistribution grid and is introduced into the bed downstream of the DME.

In FIG. 50, the part of the common walls extending inside the redistribution space is inclined relative to the DME axis.

Without departing from the framework of the invention, it is understood that the extension of the common walls of the mixing chamber can be produced inside the collecting space.

These walls then have inlet orifices that have characteristics substantially identical to those described for orifices $O_{m1}$ and $O_{m2}$. Likewise, the shapes of these walls and their positions relative to the DME axis, for example, meet criteria substantially identical to the criteria described for FIG. 50, for example.

We claim:

1. A column allowing separation of a substance from a fluid having a plurality of separable compounds, having at least a first and a second bed of granular solids separated by at least one device, the device having at least a collection device which collects the substance to be separated, the at least one collection device being in fluid connection to at least one mixing chamber, at least a first circuit for injection and/or removal of a first secondary fluid $B_1$ and at least a second injection and/or removal circuit of a second secondary fluid $B_2$, the injection and/or removal circuits being in communication with the at least one mixing chamber with at least one opening allowing passage of the secondary fluids $B_1$, $B_2$ into the at least one mixing chamber, the at least one mixing chamber having at least one inlet orifice and one outlet orifice, and a device which redistributes the fluid coming from the at least one mixing chamber, wherein the injection and/or removal circuits are separated and disposed in a vicinity of the at least one mixing chamber along at least one wall of the at least one chamber that has a direction substantially parallel to the device axis.

2. A column according to claim 1, comprising at least one device having at least four independent injection and/or removal circuits disposed along at least one of the walls of the at least one mixing chamber, the at least one wall of the at least one mixing chamber having a direction substantially parallel to the axis of the column.

3. A column according to claim 2, wherein the at least one mixing chamber of the device has at least one baffle provided with at least one orifice allowing the fluid to pass, which subdivides the at least one chamber into a plurality of mixing subchambers.

4. A column according to claim 1, wherein the collection device and/or the redistribution device have a shape which minimizes differences in travel time of fluid lines passing through at least part of a bed of granular solids before entry into the at least one mixing chamber and/or which homogenizes travel time of each fluid line coming from the at least one mixing chamber up to a point of entry into the second bed located downstream of the device.

5. A column according to claim 1, comprising a plurality of devices disposed side by side and distributed along at least one section of the column.

6. A column according to claim 1, comprising a plurality of devices and having a seal between the plurality of devices and the outer wall of the column, so that the fluid passes through the at least one mixing chamber of each of the plurality of devices.

7. A column according to claim 1, comprising at least one main fluid distribution conduit extending from an outside wall of the column to at least one injection and/or removal chamber dedicated to one fluid, the at least one main fluid distribution conduit being connected to at least one of the injection and/or removal chambers by a branch, the at least one main fluid distribution conduit passing through the outside wall of the column.

8. A column according to claim 2, wherein the at least one collection device and/or the redistribution device have a shape which minimizes differences in travel time of fluid lines passing through at least part of the at least first and second beds of granular solids before entry into the at least one mixing chamber and/or which homogenizes travel time of each fluid line coming from the mixing chamber up to a point of entry into the second bed located downstream of the device.

9. A column according to claim 3, wherein the at least one collection device and/or the redistribution device have a shape which minimizes differences in travel time of fluid lines passing through at least a part of the at least first and second beds of granular solids before entry into the at least one mixing chamber and/or which homogenizes travel time of each fluid line coming from the mixing chamber up to a point of entry into the second bed located downstream of the device.

10. A column according to claim 2, comprising a plurality of devices disposed side by side and distributed along at least one section of the column.

11. A column according to claim 3, comprising a plurality of devices disposed side by side and distributed along at least one section of the column.

12. A column according to claim 3, comprising a plurality of devices and a seal disposed between the plurality of devices and an outer wall of the column, so that the fluid passes through the mixing chambers of the plurality of devices.

13. A column for separating at least one substance from a fluid having a plurality of separable compounds, comprising:

at least one support disposed along one lengthwise axis of the column;

at least one main beam, the at least one beam being connected to the at least one support;

a plurality of devices, the plurality of devices being disposed in any given section around the at least one support and above the at least one main beam the plurality of devices being separated from each other by a seal, the plurality of devices being disposed between a first and a second bed of granular solids and the at least one main beam be ing embedded in the second bed of granular solids; and at least one device which distributes and/or couples a fluid to an injection and/or a removal circuit.

* * * * *